United States Patent
Manley

(10) Patent No.: US 6,210,310 B1
(45) Date of Patent: Apr. 3, 2001

(54) CUSHIONING CONVERSION MACHINE AND METHOD WITH ENHANCED STOCK SEPARATION AND FORMING

(75) Inventor: Thomas E. Manley, Mentor, OH (US)

(73) Assignee: Ranpak Corp., Painesville Township, OH (US)

( * ) Notice: Subject to any disclaimer, the term of this patent is extended or adjusted under 35 U.S.C. 154(b) by 0 days.

(21) Appl. No.: 09/294,958

(22) Filed: Apr. 20, 1999

Related U.S. Application Data

(63) Continuation-in-part of application No. 09/229,459, filed on Jan. 12, 1999.

(60) Provisional application No. 60/085,721, filed on May 15, 1998, and provisional application No. 60/071,213, filed on Jan. 12, 1998.

(51) Int. Cl.⁷ .................................................. B31B 1/00
(52) U.S. Cl. ................................. 493/464; 493/967
(58) Field of Search .................................... 493/464, 967

(56) References Cited

U.S. PATENT DOCUMENTS

| | | |
|---|---|---|
| 2,882,802 | 4/1959 | Walker . |
| 3,509,797 | 5/1970 | Johnson . |
| 3,603,216 | 9/1971 | Johnson . |
| 3,799,039 | 3/1974 | Johnson . |
| 4,650,456 | 3/1987 | Armington . |
| 4,717,613 | 1/1988 | Ottaviano . |
| 4,750,896 | 6/1988 | Komaransky et al. . |
| 4,884,999 | 12/1989 | Baldacci . |
| 5,054,758 | 10/1991 | Windsor, III . |
| 5,123,889 | 6/1992 | Armington et al. . |
| 5,203,761 | 4/1993 | Reichental et al. . |
| 5,211,620 | 5/1993 | Ratzel et al. . |
| 5,322,477 | 6/1994 | Armington et al. . |
| 5,466,210 | 11/1995 | Wilcox . |
| 5,558,923 | 9/1996 | Vesamaa . |
| 5,569,146 | 10/1996 | Simmons . |
| 5,593,376 | 1/1997 | Armington et al. . |
| 5,607,383 | 3/1997 | Armington et al. . |
| 5,643,167 | 7/1997 | Simmons . |
| 5,709,642 | 1/1998 | Ratzel et al. . |
| 5,791,483 * | 8/1998 | Simmons ............................ 493/464 |
| 5,813,967 * | 9/1998 | Davila ............................... 493/464 |
| 5,882,287 | 3/1999 | Kuckhermann . |
| 5,891,009 * | 4/1999 | Ratzel ................................ 493/464 |
| 5,908,375 * | 6/1999 | Simmons et al. .................. 493/464 |
| 5,924,971 * | 7/1999 | Simmons ............................ 493/464 |

FOREIGN PATENT DOCUMENTS

| | | |
|---|---|---|
| 0679504A1 | 4/1994 | (EP) . |
| 9955980 | 6/1965 | (GB) . |
| 95/31296 | 11/1995 | (WO) . |
| 96/40496 | 12/1996 | (WO) . |
| 97/01434 | 1/1997 | (WO) . |

* cited by examiner

*Primary Examiner*—Eugene Kim
(74) *Attorney, Agent, or Firm*—Renner, Otto, Boisselle & Sklar, LLP

(57) ABSTRACT

A cushioning conversion machine including a conversion assembly which converts a sheet stock material into a relatively less dense cushioning product. The conversion assembly includes a forming assembly, having an external forming device and an internal forming device positioned at least partially within the external forming device, the forming assembly inwardly turning lateral regions of the sheet stock material as the sheet stock material travels through the forming assembly in an upstream to downstream direction. The sheet stock material passes between the external forming device and the internal forming device as it travels through the forming assembly. The internal forming device has a central guide portion with a bottom guide surface which guides a central region of the sheet stock material as its lateral regions are inwardly turned, and a cascade portion having stages disposed above the bottom guide surface of the central guide portion. The stages define therebetween relatively relieved areas which facilitate the formation of creases in the lateral regions of the sheet stock material as it passes over the cascade portion of the internal forming device.

26 Claims, 16 Drawing Sheets

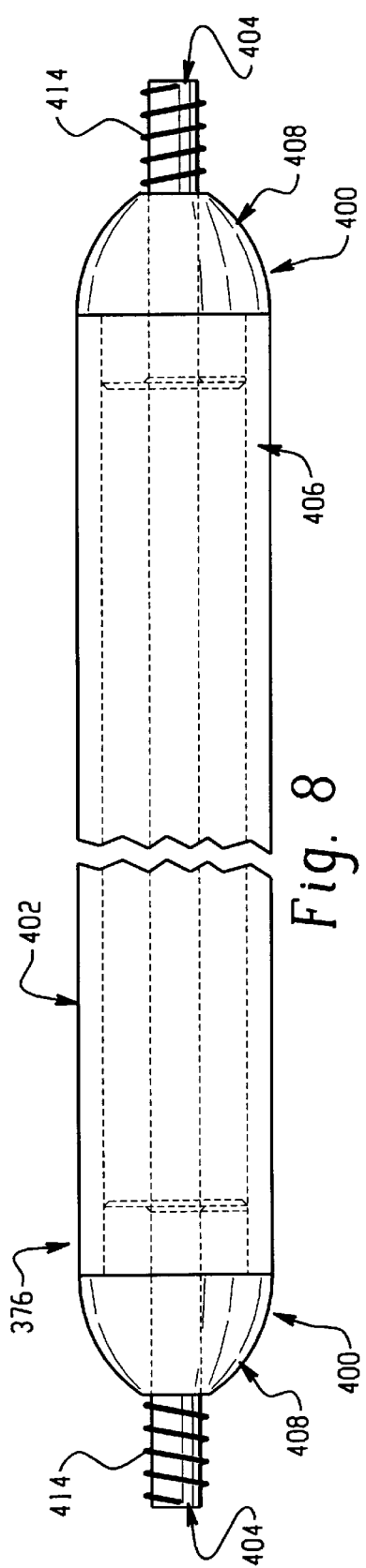
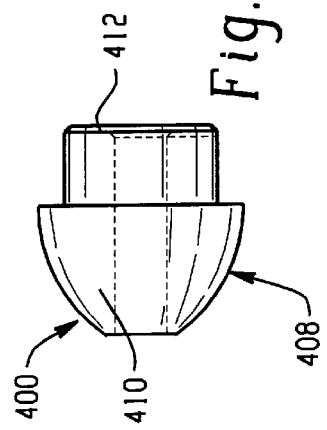
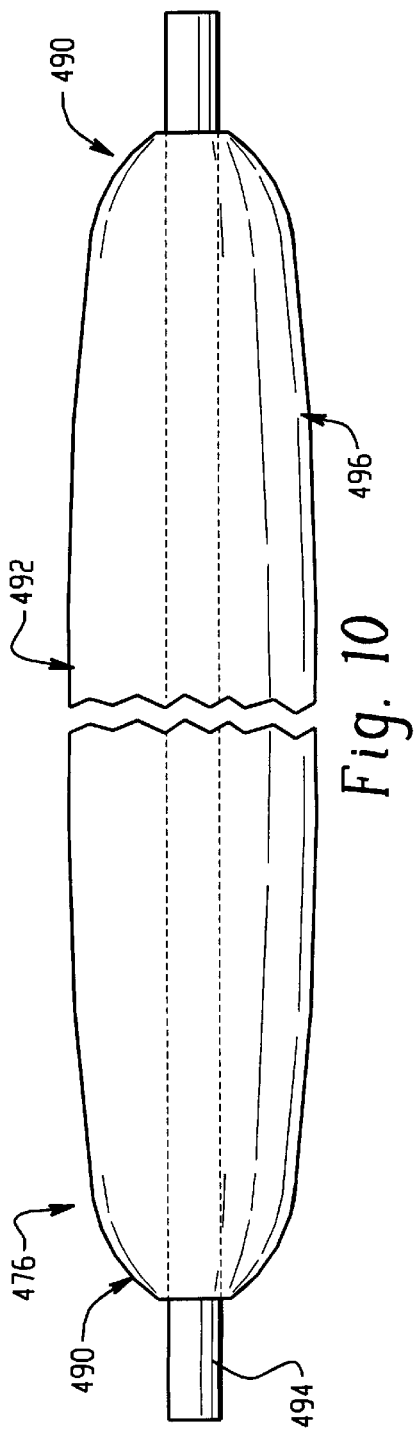
Fig. 8
Fig. 9
Fig. 10

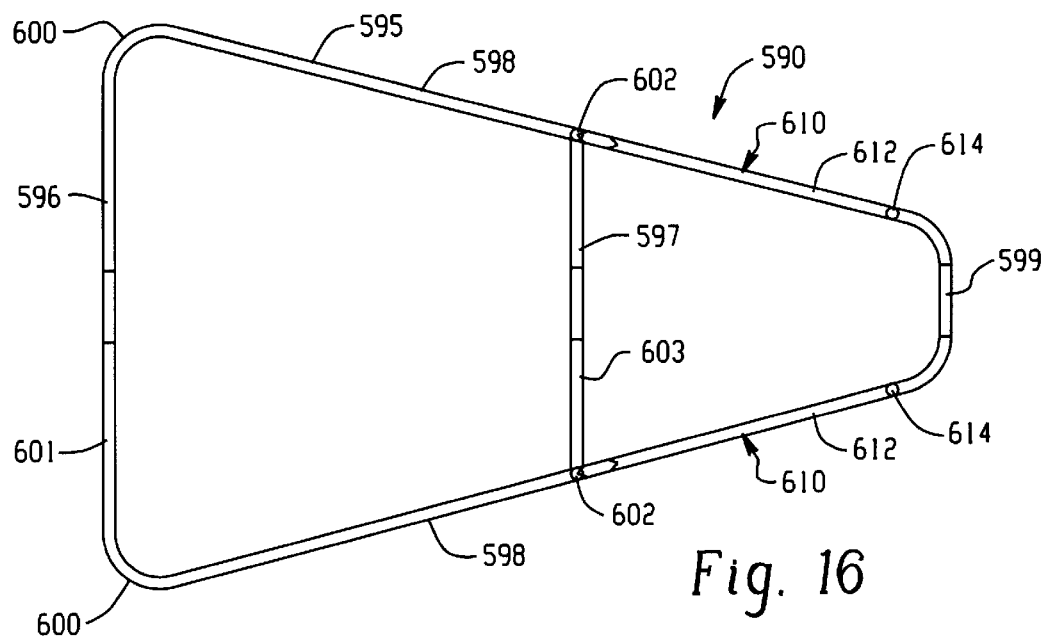
Fig. 16
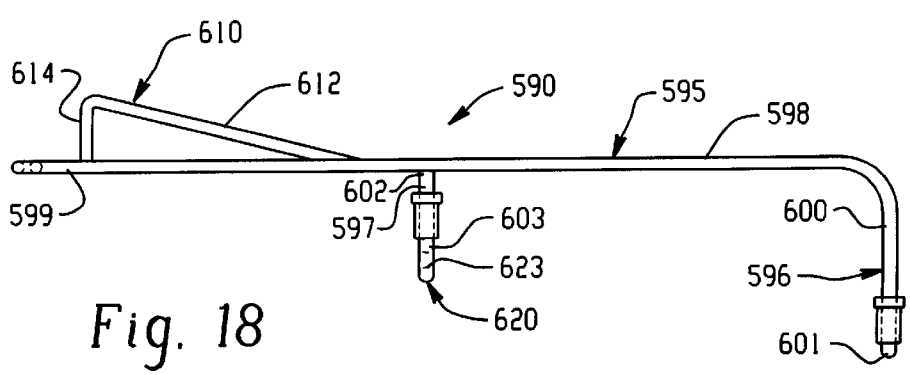
Fig. 17
Fig. 18

CUSHIONING CONVERSION MACHINE AND METHOD WITH ENHANCED STOCK SEPARATION AND FORMING

RELATED APPLICATION DATA

This application is a continuation-in-part of U.S. patent application No. 09/229,459 filed Jan. 12, 1999, which claims the benefit of U.S. Provisional Patent Application No. 60/071,213 filed Jan. 12,1998, and U.S. Provisional Patent Application No. 60/085,721 filed May 15, 1998. The entire disclosures of these applications are hereby incorporated by reference in their entireties.

FIELD OF THE INVENTION

The present invention generally relates to a cushioning conversion machine and method. More particularly, the present invention provides an improved internal forming device for use in a cushioning conversion machine or method.

BACKGROUND OF INVENTION

In the process of shipping an item from one location to another, a protective packaging material is typically placed in a shipping case, or box, to fill any voids and/or to cushion the item during the shipping process. Some conventional protective packaging materials are plastic foam peanuts and plastic bubble pack. While these conventional plastic materials seem to perform adequately as cushioning products, they are not without disadvantages. Perhaps the most serious drawback of plastic bubble wrap and/or plastic foam peanuts is their effect on our environment. Quite simply, these plastic packaging materials are not biodegradable and thus they cannot avoid further multiplying our planet's already critical waste disposal problems. The non-biodegradability of these packaging materials has become increasingly important in light of many industries adopting more progressive policies in terms of environmental responsibility.

These and other disadvantages of conventional plastic packaging materials has made paper protective packaging material a popular alternative. Paper is biodegradable, recyclable and composed of a renewable resource; making it an environmentally responsible choice for conscientious industries. While paper in sheet form could possibly be used as a protective packaging material, it is usually preferable to convert the sheets of paper into a relatively lower density pad or cushioning dunnage product. This conversion may be accomplished by a cushioning conversion machine, such as that disclosed in U.S. Pat. No. 5,322,477. This patent is assigned to the assignee of the present application and its entire disclosure is hereby incorporated herein by reference in its entirety.

The cushioning conversion machine disclosed in U.S. Pat. No. 5,322,4775 comprises a conversion assembly which converts multi-ply sheet stock material into a three-dimensional cushioning product with a relatively lower density and a stock supply assembly which supplies the multi-ply stock material to the conversion assembly. The conversion assembly includes a forming assembly which inwardly turns the lateral regions of the stock material as it travels downstream therethrough. This inward turning results in lateral regions of the stock material experiencing edge tension which sometimes results in ripping or tearing of the stock material.

A need remains for further improvements to prevent excessive edge tension and/or the tearing associated therewith. This need is especially critical for the conversion of lesser quality and/or short fiber paper. Additionally or alternatively, a need remains for other improvements to the cushioning conversion machine to work in conjunction with tension distributing or controlling devices, or otherwise, to improve or to enhance the conversion process to efficiently produce an improved cushioning product.

SUMMARY OF THE INVENTION

The present invention is a cushioning conversion machine and method for converting sheet stock material into a relatively less dense cushioning product having improved cushioning properties, and more particularly, into a cushioning product formed from stock material having its lateral regions inwardly turned and connected along a narrow central band, leaving an increased amount of stock material in the lateral pillow portions, and providing improved cushioning properties in the pillow portions.

More particularly, the present invention provides a cushioning conversion machine including a conversion assembly which converts a sheet stock material into a relatively less dense cushioning product. The conversion assembly includes a forming assembly which inwardly turns lateral regions of the sheet stock material as the sheet stock material travels through the forming assembly in an upstream to downstream direction. The forming assembly includes an external forming device and an internal forming device positioned at least partially within the external forming device and between which the sheet stock material passes as it travels through the forming assembly. The internal forming device has a central guide portion having a bottom guide surface which guides a central region of the sheet stock material as lateral regions of the sheet stock material are inwardly turned, and a cascade portion including stages disposed above the bottom guide surface of the guide portion. The stages define therebetween relatively relieved areas which facilitate the formation of creases in the lateral regions of the sheet stock material while enabling a desired percentage of the stock material to reside in the lateral pillow portions.

The present invention also provides a method of making a cushioning product that includes converting a sheet stock material into a relatively less dense cushioning product, including inwardly turning lateral regions of the sheet stock material as the sheet stock material travels through a forming assembly in an upstream to downstream direction; passing the sheet stock material between an external forming device and an internal forming device which are included in the forming assembly; guiding a central region of the sheet stock material with a bottom guide surface of a central guide portion of the internal forming device as the lateral regions of the stock material are inwardly turned; and guiding the lateral regions of the sheet stock material in a laterally undulating motion to facilitate the formation of creases in the lateral regions of the sheet stock material with a cascade portion disposed above the bottom guide surface, the cascade portion including a plurality of stepped stages defining relatively relieved areas therebetween. The relieved areas permit lateral regions of the sheet stock material to "fold" therein to effect such undulating motion and enhanced creasing.

The internal forming device and associated method are particularly useful in combination with curved ply separator members and/or tension control mechanisms which provide for tension dampening. The invention also is directed to the provision of an internal forming device that may be used in place of existing internal forming devices in prior art or other conversion machines.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DRAWINGS

FIG. 1 is a side view of a cushioning conversion machine similar to that disclosed in U.S. Pat. No. 5,322,477, the machine being shown positioned in a horizontal manner, loaded with stock material, and with an outer housing side wall removed for clarity of illustration.

Figure 1:
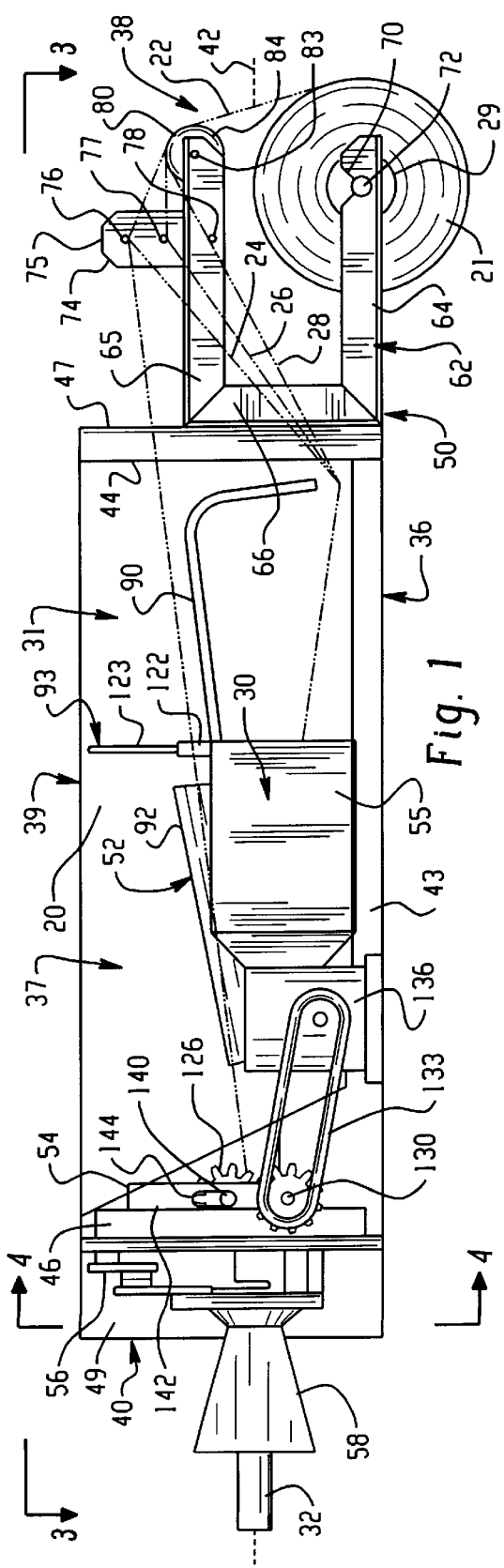
Figure 4:
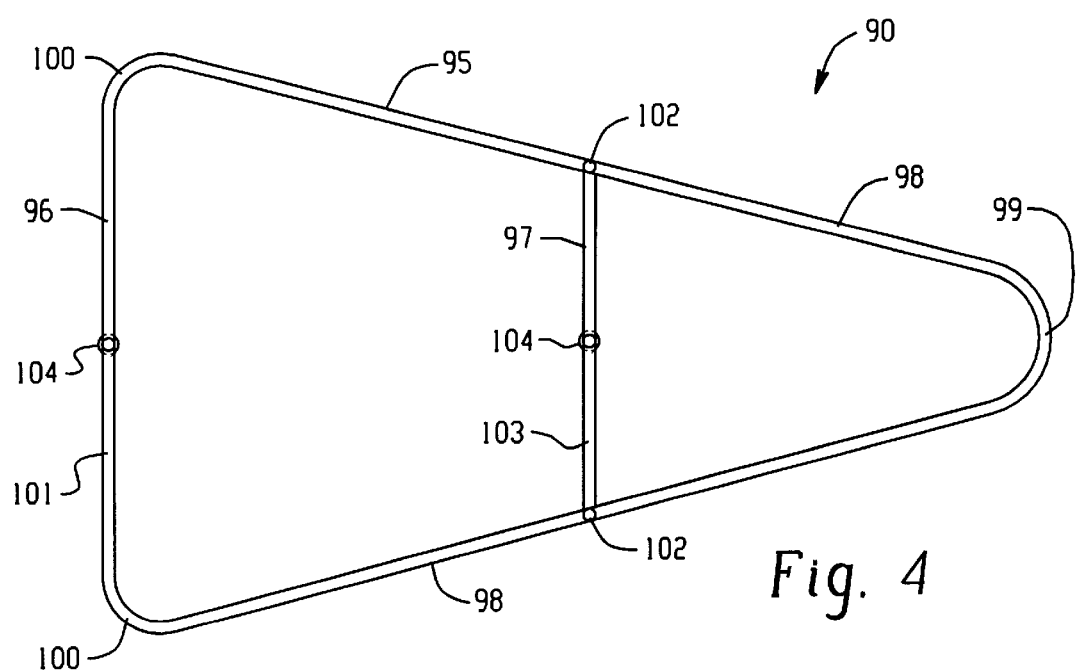
Figure 5:
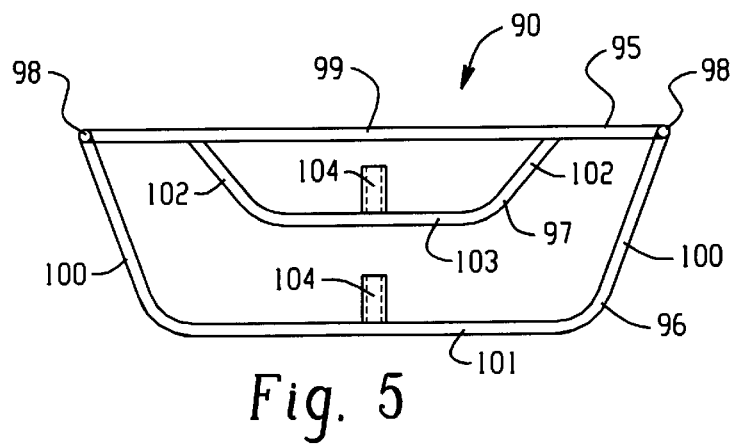
Figure 6:
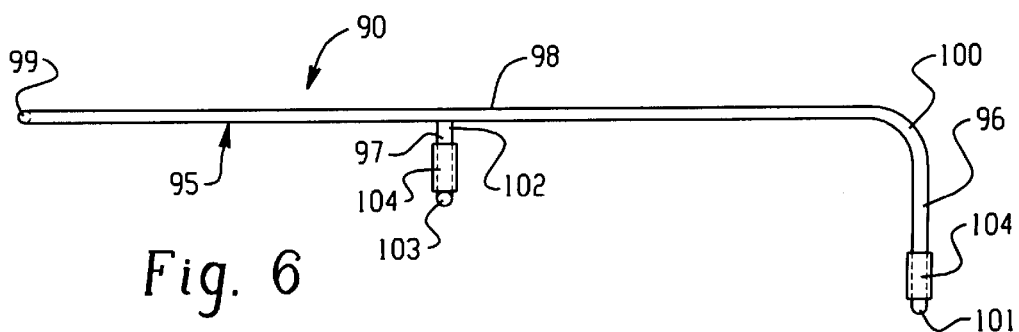

FIGS. 4, 5, and 6 are top, upstream end, and side views, respectively, of the internal forming device used in the cushioning conversion machine shown in FIG. 1.

Figure 7:
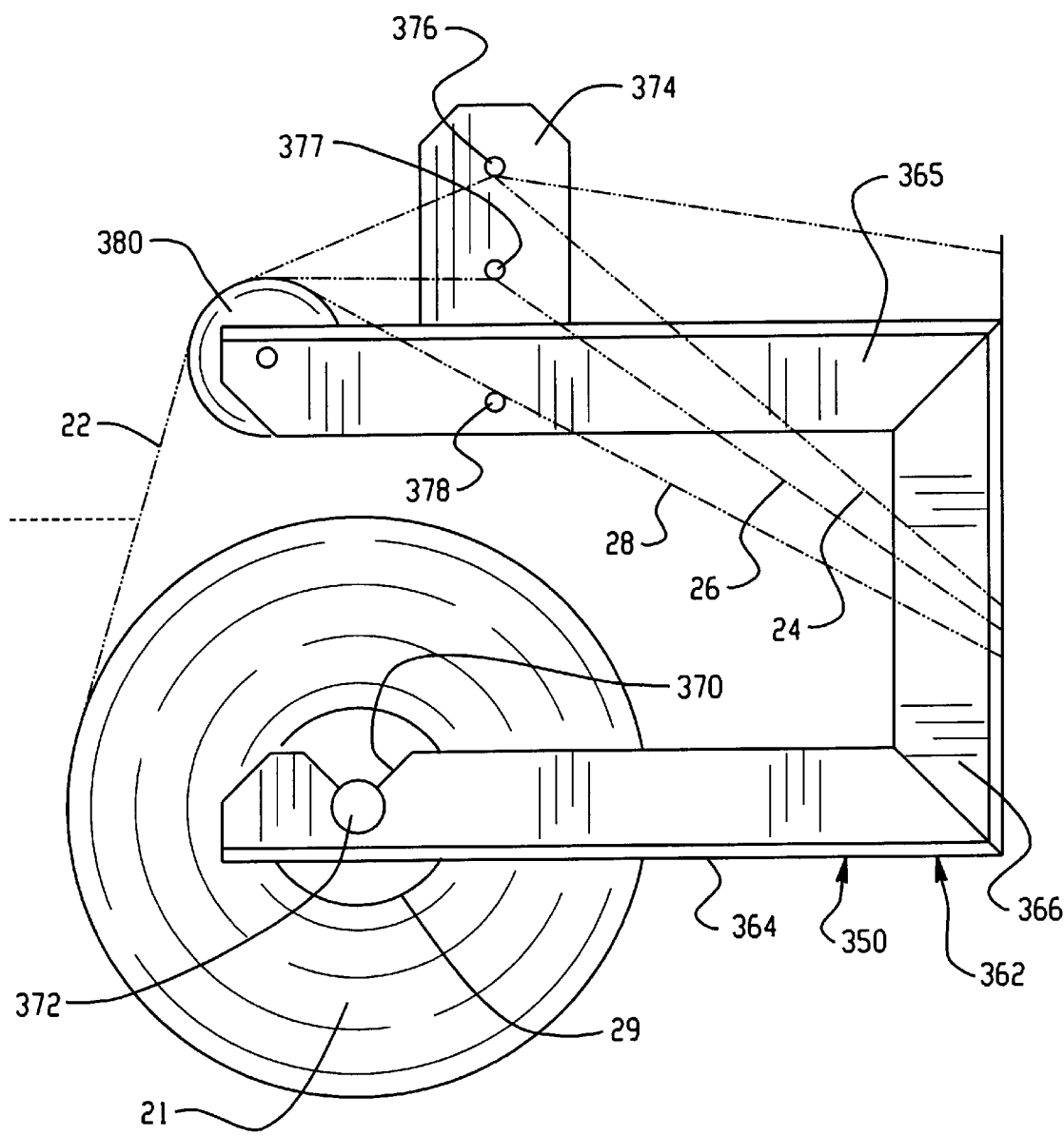

FIG. 7 is a side schematic view of a stock supply assembly according to the present invention, the stock supply assembly including a separating device with an inner separating member, an outer separating member, and an intermediate separating member.

FIG. 8 is a top view of the outer or inner separating member.

FIG. 9 is a top view of an end cap of the outer separating member.

FIG. 10 is a top view of another form of outer or inner separating member which may be used in a stock supply assembly according to the present invention.

Figure 11:
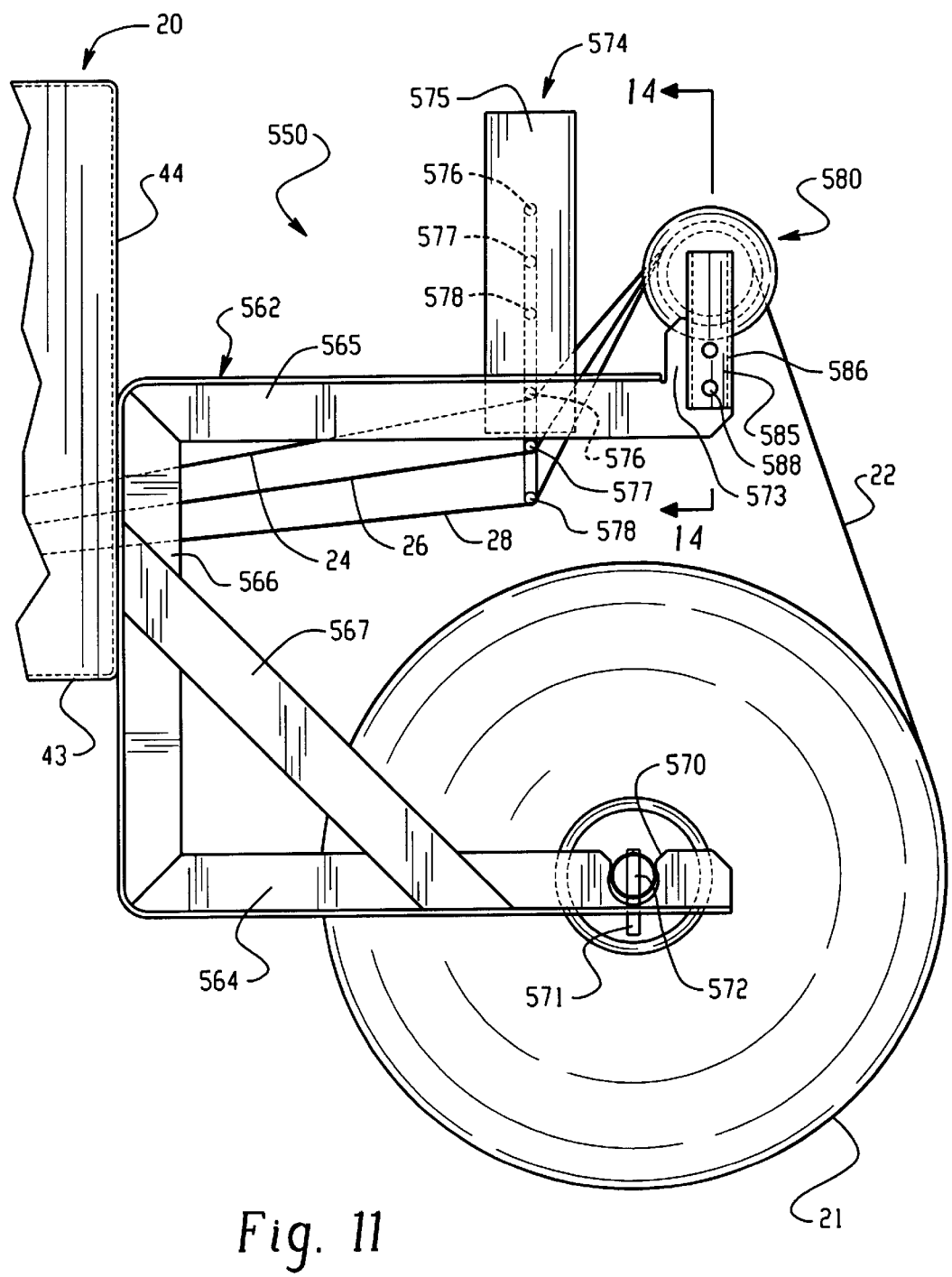

FIG. 11 is a side view of another stock supply assembly.

Figure 12:
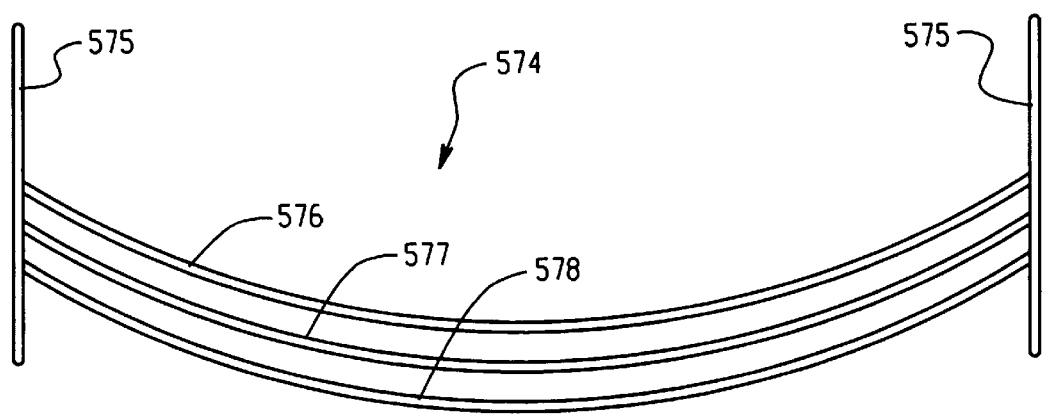

FIG. 12 is a downstream end view of a separating device of the stock supply assembly shown in FIG. 11.

Figure 13:
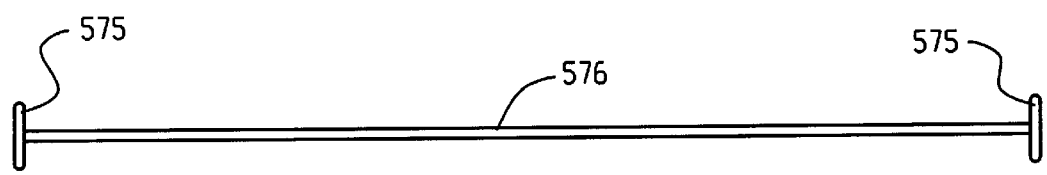

FIG. 13 is a top view of the separating device shown in FIG. 12.

Figure 14:
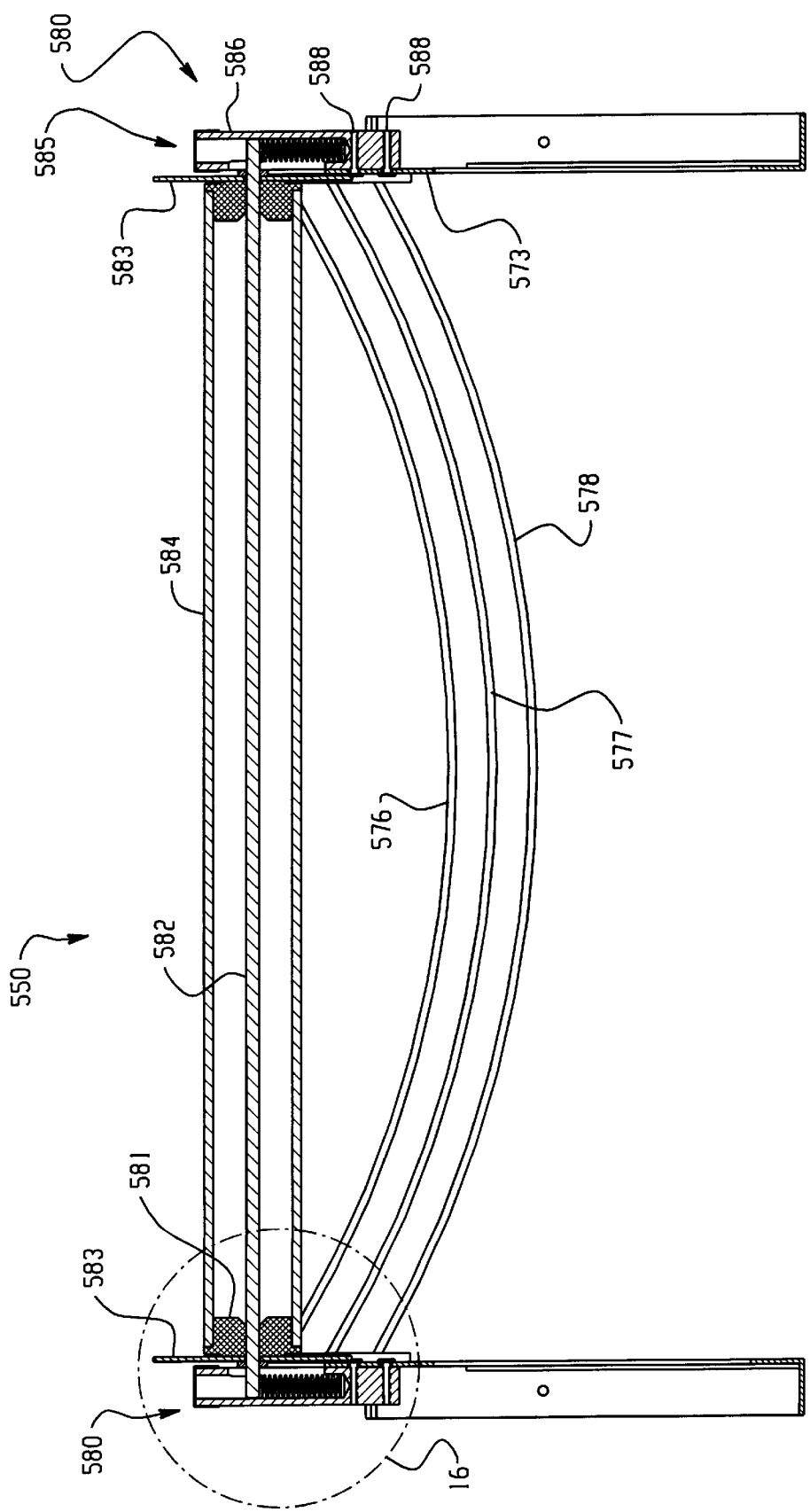

FIG. 14 is a cross-sectional downstream view of the stock supply assembly of FIG. 11 as seen along line 14—14 of FIG. 11.

Figure 15:
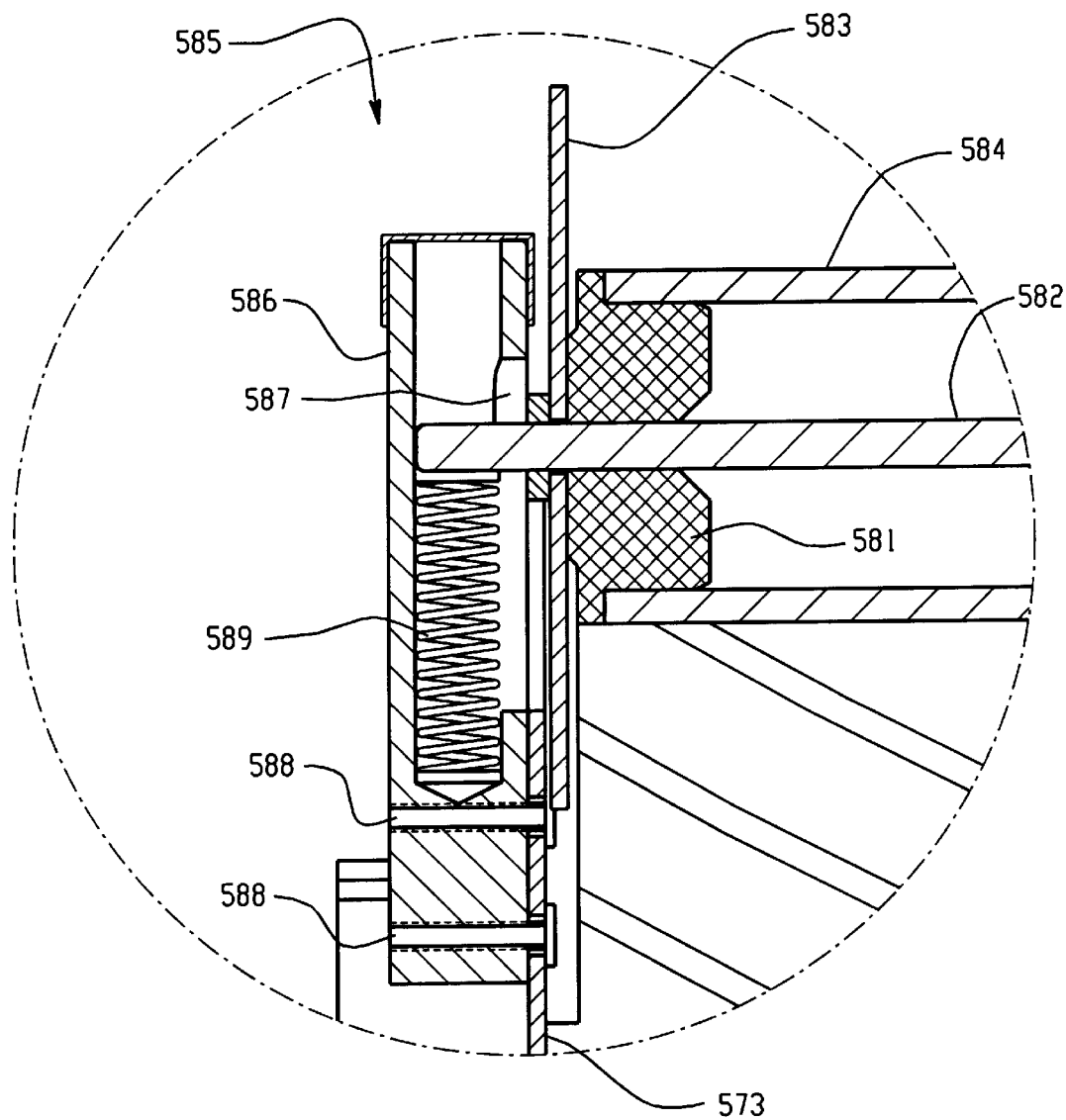

FIG. 15 is an enlarged cross-sectional view of a component of a constant entry device of the stock supply assembly shown in FIG. 14.

FIGS. 16, 17, and 18 are top, upstream end, and side views, respectively, of another internal forming device which may be used in the cushioning conversion machine shown in FIG. 1.

Figure 19:
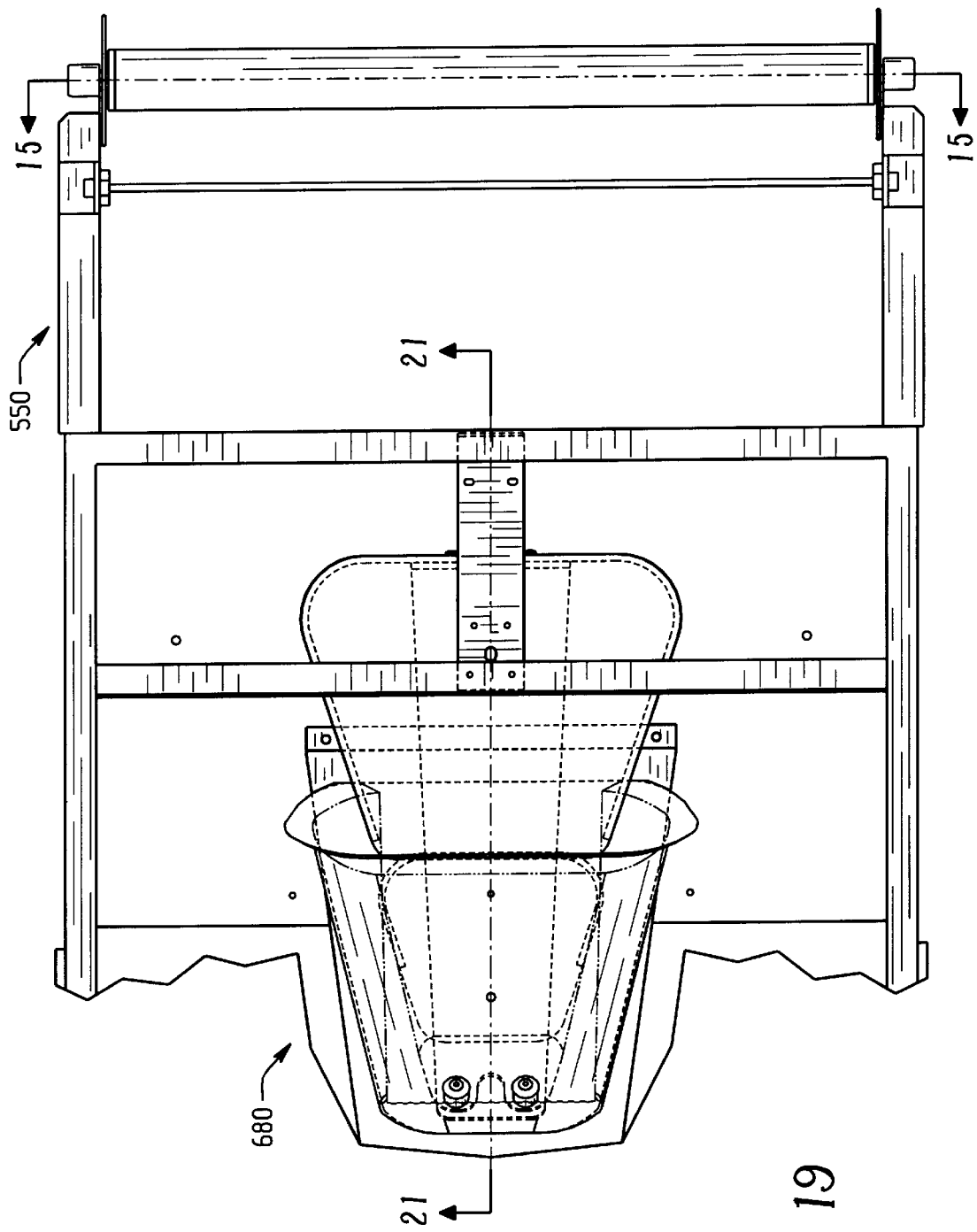

FIG. 19 is a partial top view of a cushioning conversion machine with another embodiment of a forming assembly and another embodiment of a stock supply assembly that may be used in the cushioning conversion machine of FIG. 1 in accordance with the present invention.

Figure 20:
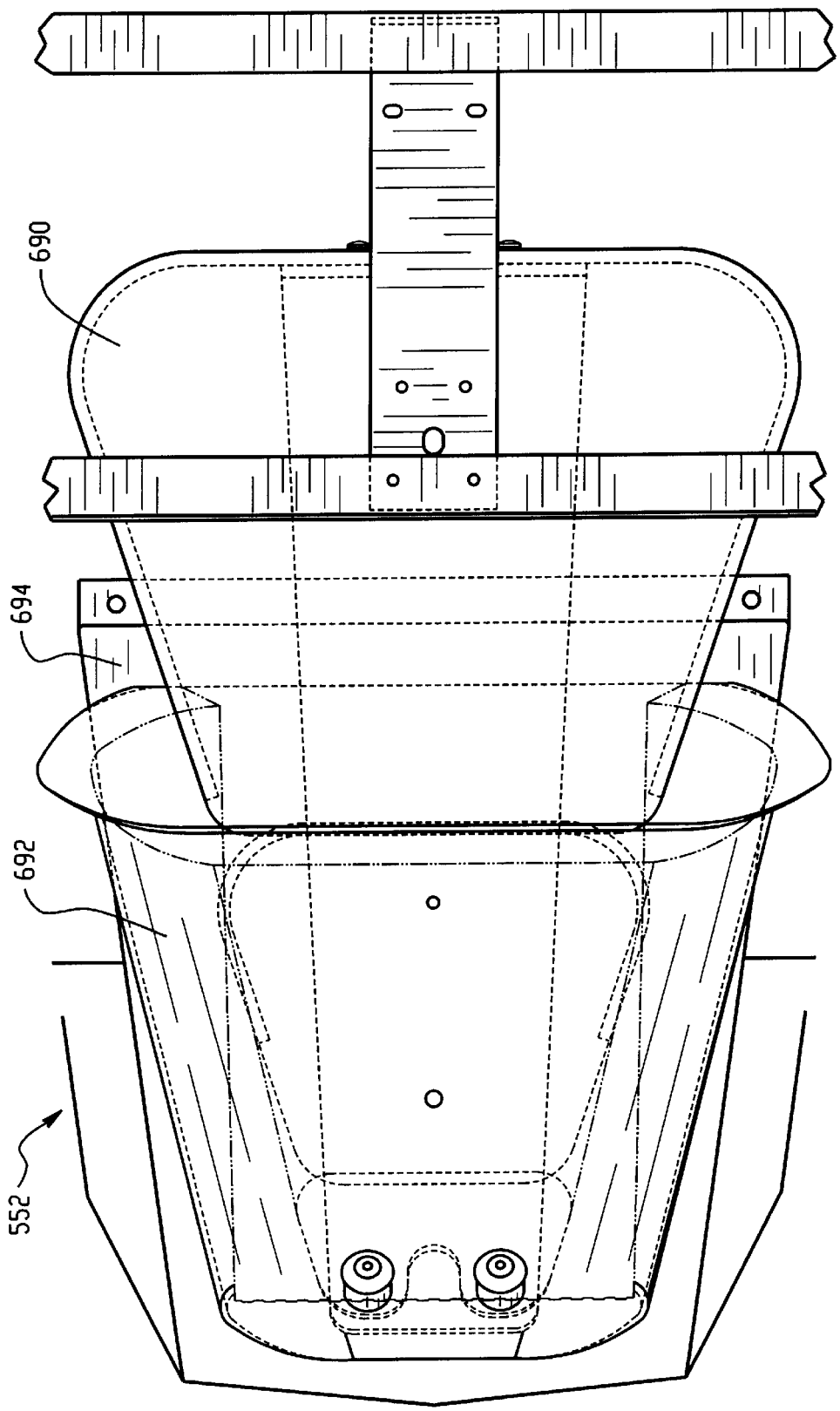

FIG. 20 is an enlarged top view of the forming assembly shown in FIG. 19.

Figure 21:
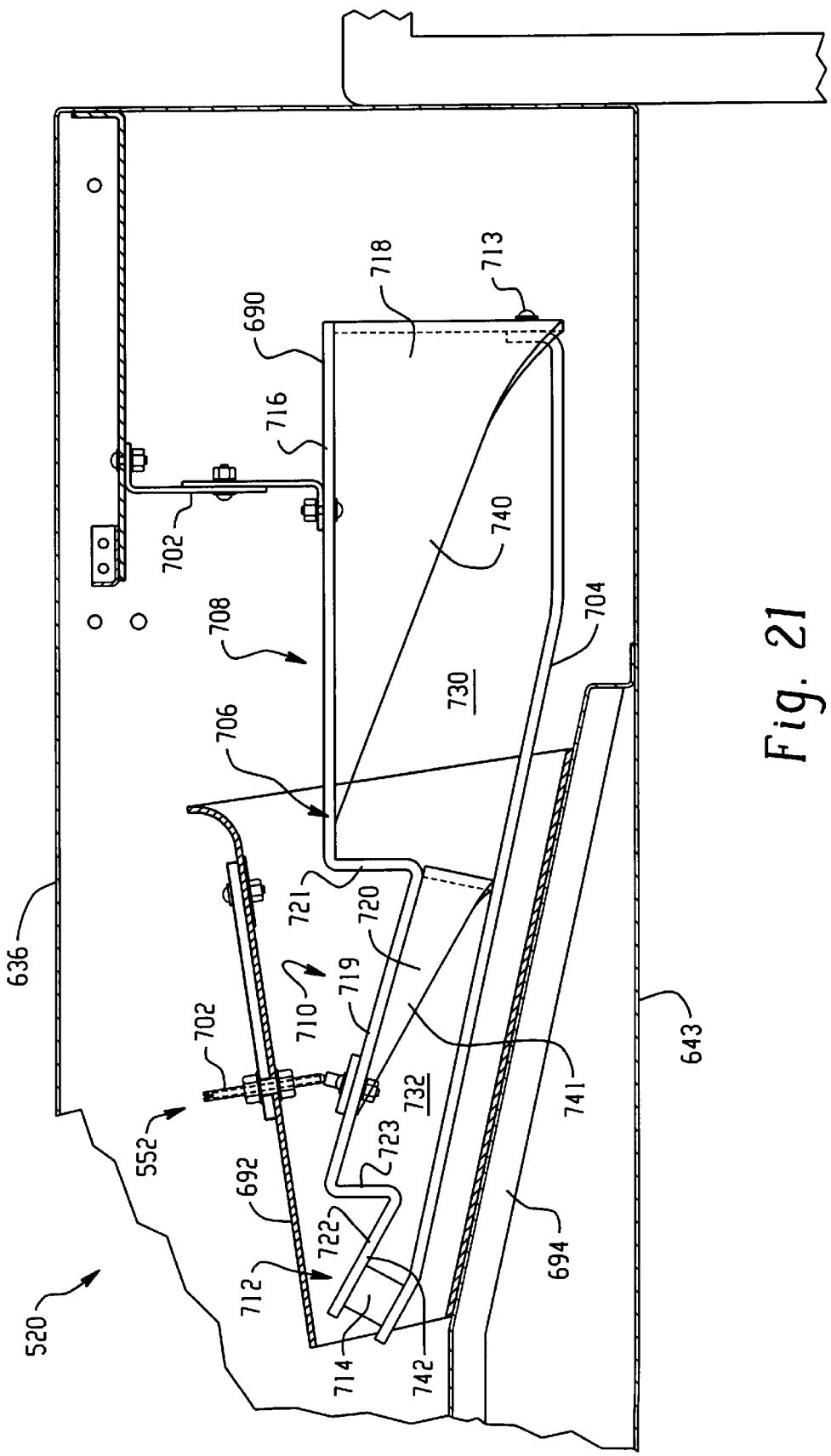

FIG. 21 is a cross-sectional view of the forming assembly as seen along line 21—21 of FIG. 19.

Figure 22:
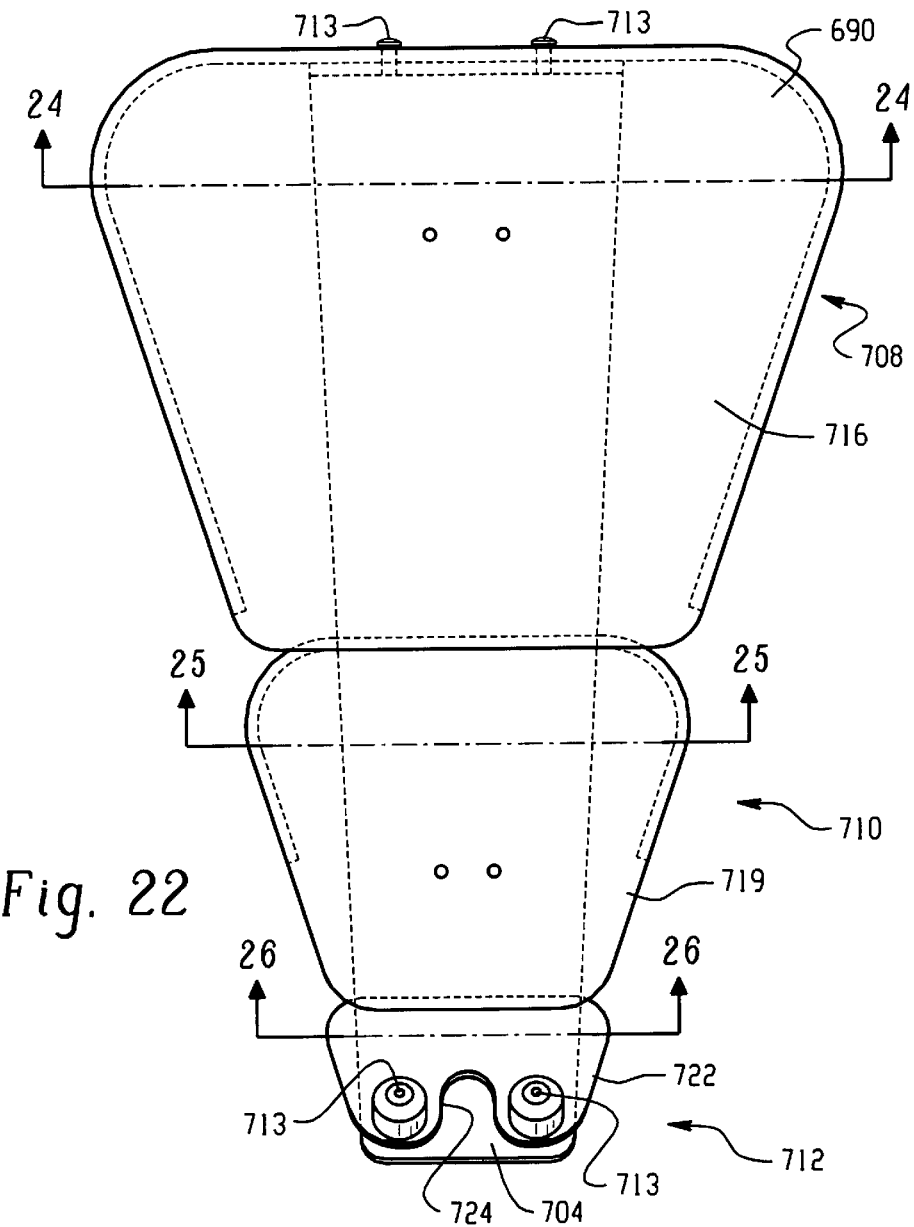

FIG. 22 is a top view of an internal forming device shown in FIG. 19.

Figure 23:
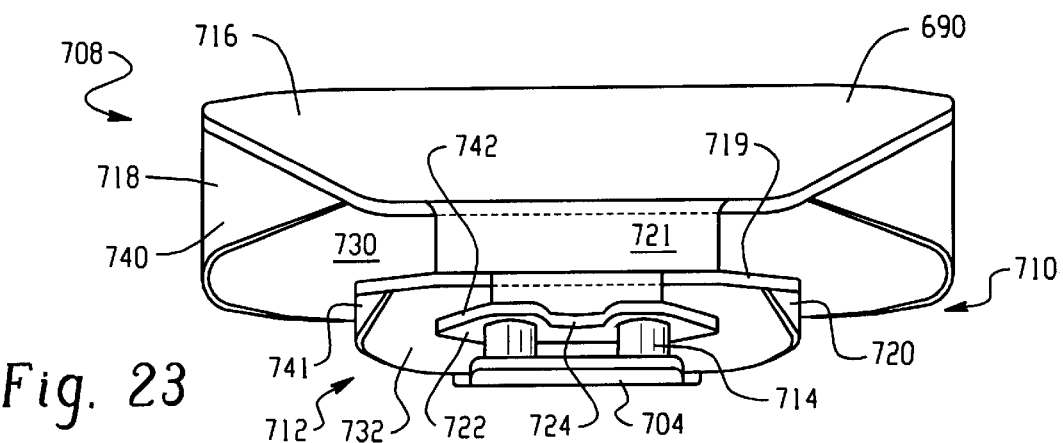

FIG. 23 is a downstream view of the internal forming device shown in FIG. 22.

Figure 26:
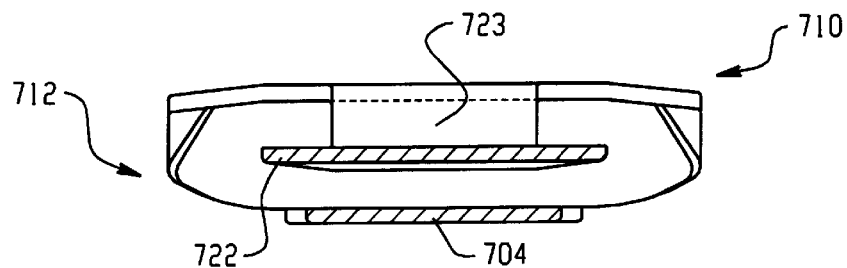
Figure 25:
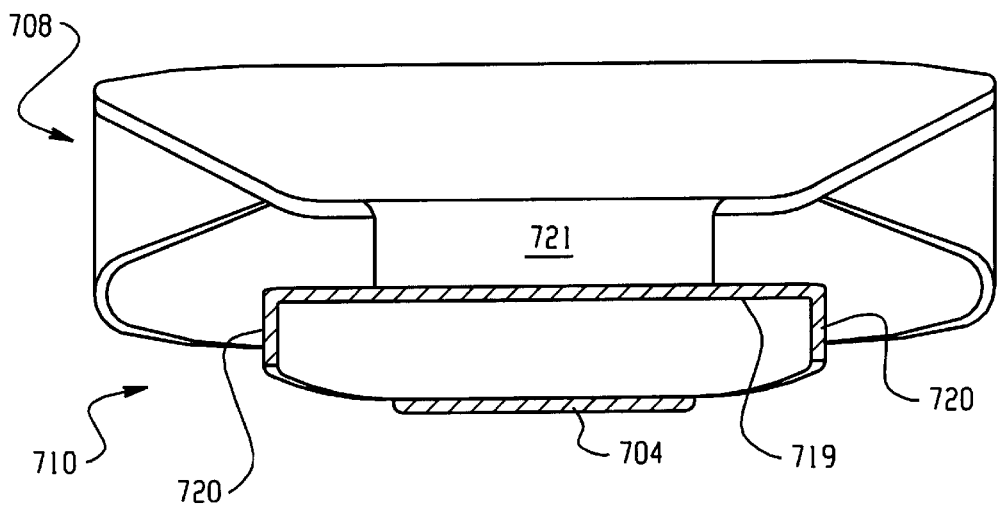
Figure 24:
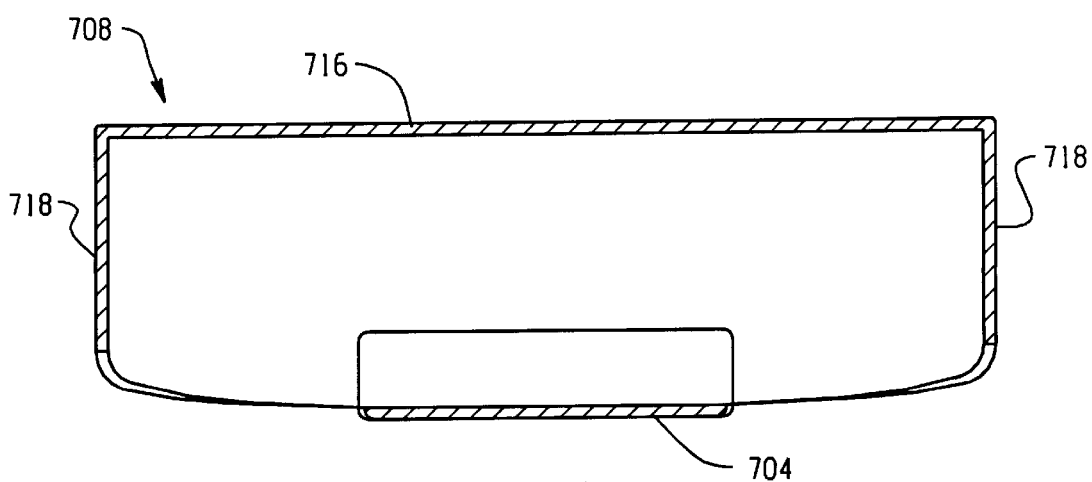

FIGS. 24, 25, and 26 are cross-sectional views of the internal forming device shown in FIG. 22 as seen from the downstream end along lines 24—24, 25—25, and 26—26, respectively.

Figure 29:
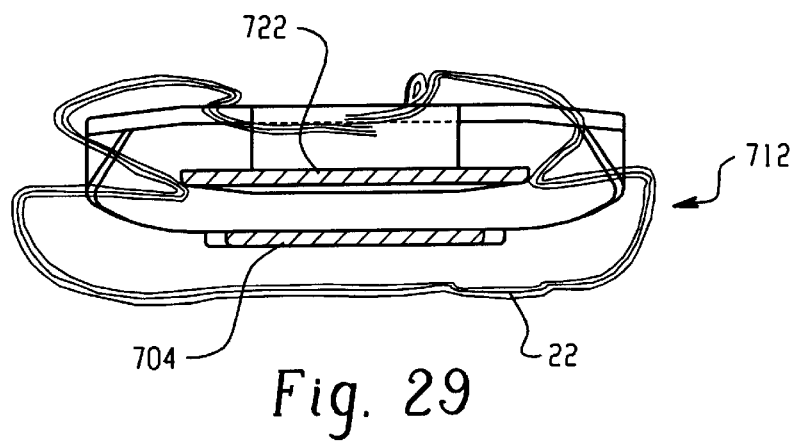
Figure 28:
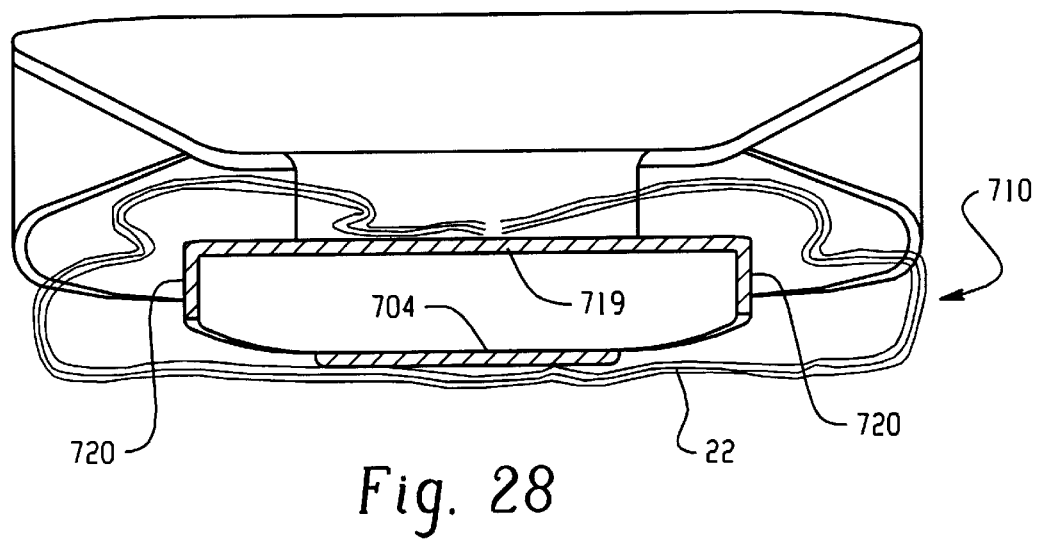
Figure 27:
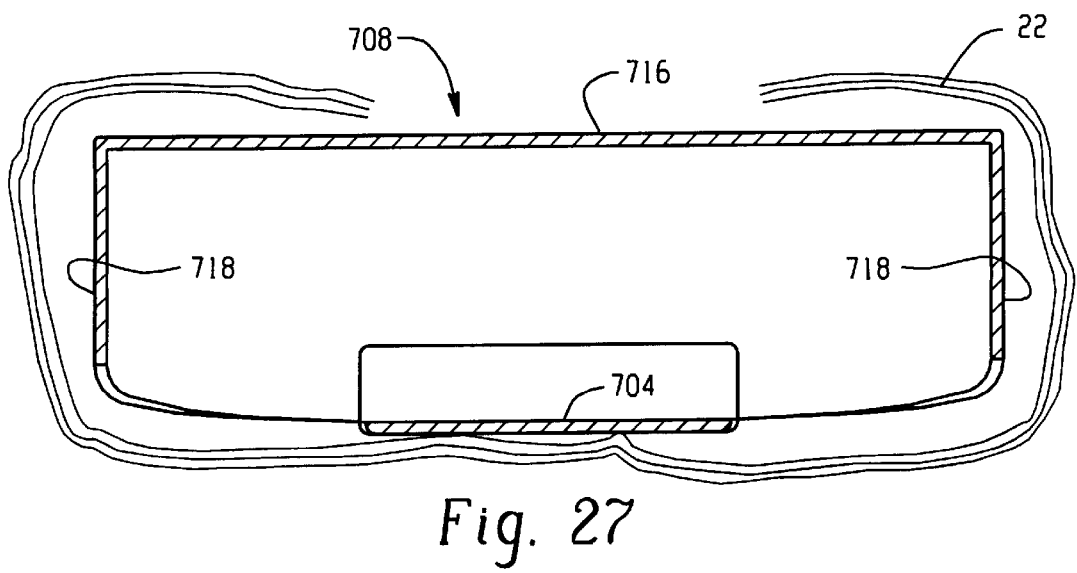

FIGS. 27, 28, and 29 are cross-sectional downstream end views of the internal forming device, corresponding to FIGS. 24, 25, and 26, respectively, that illustrate the progression of the stock material from an upstream end to a downstream end of the internal forming device.

DETAILED DESCRIPTION

Figure 2:
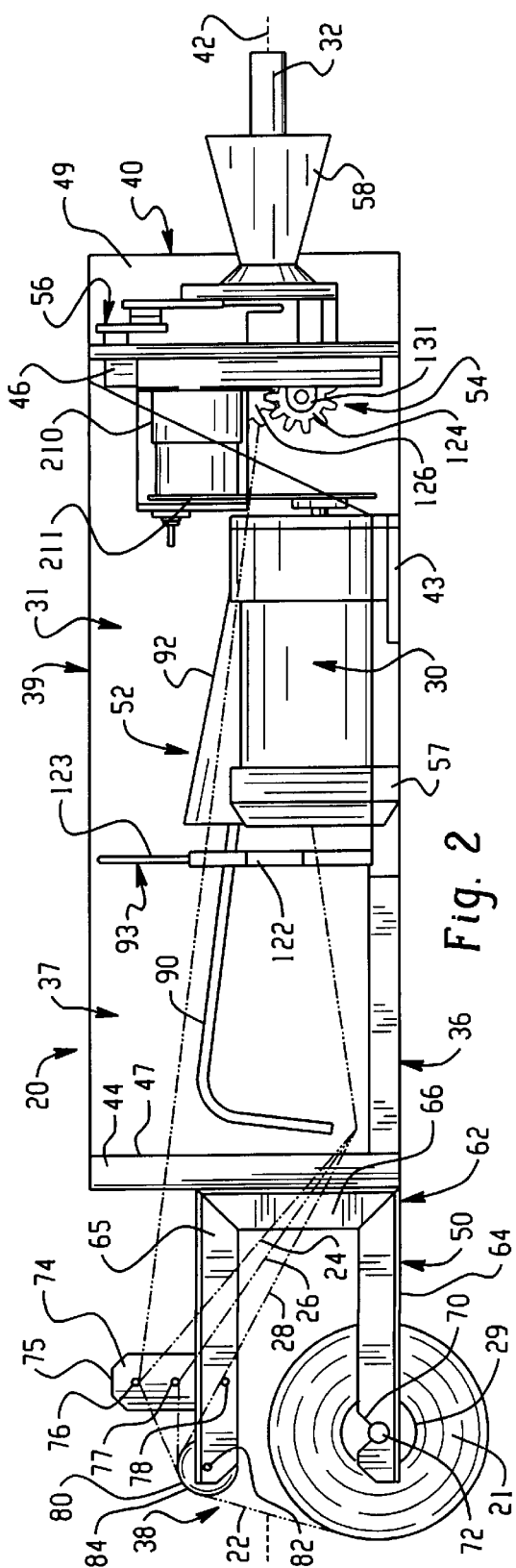
FIG. 2 is an opposite side view of the cushioning conversion machine shown in FIG. 1.
Figure 3:
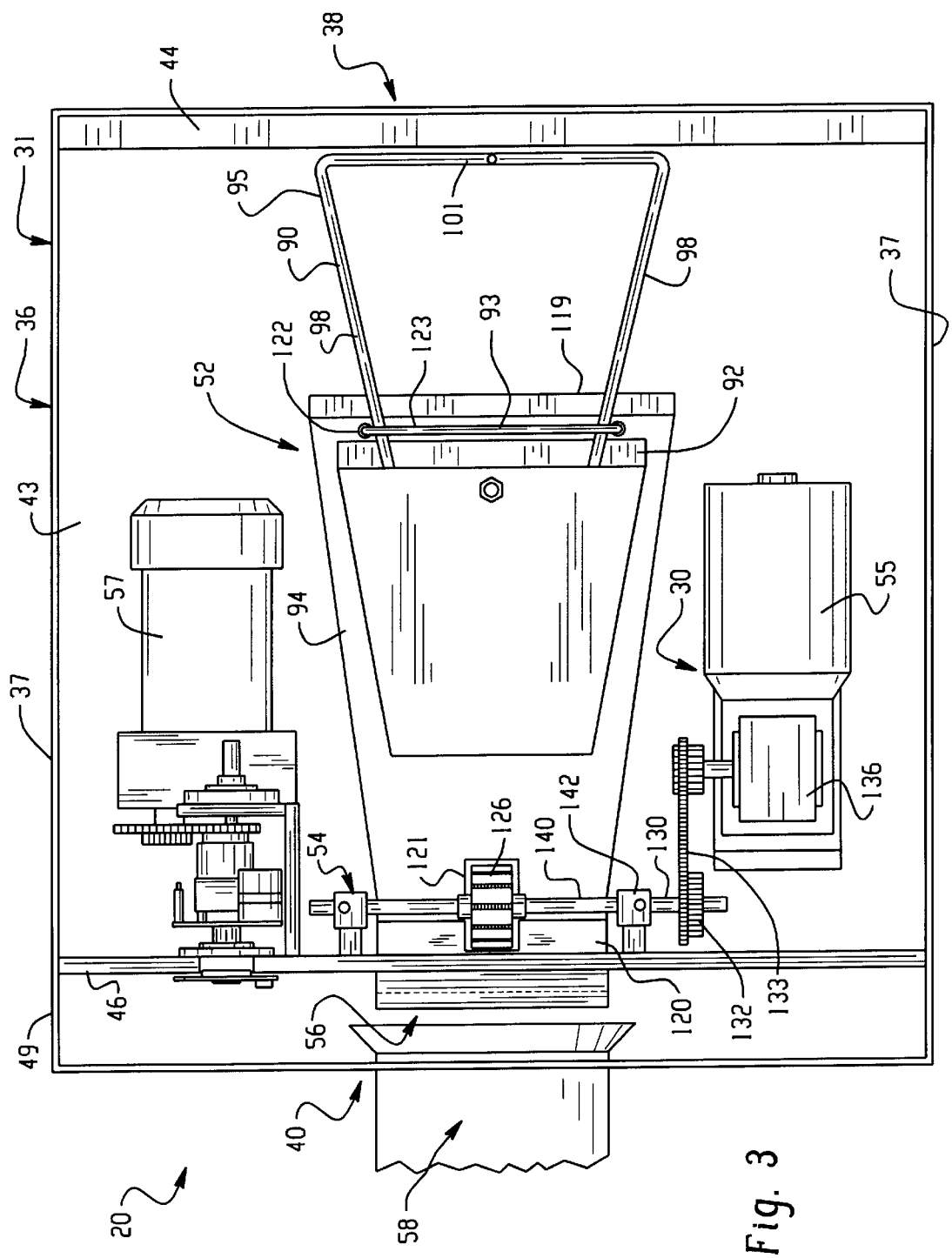
FIG. 3 is a top plan view of the cushioning conversion machine of FIG. 1, without stock material being loaded and as seen along line 3—3 in FIG. 1.

A cushioning conversion machine similar to the one disclosed in U.S. Pat. No. 5,322,477 is shown in FIGS. 1—3 and is indicated generally at 20. In FIGS. 1 and 2, the machine 20 is shown positioned in a horizontal manner and loaded with a roll 21 of sheet stock material 22. The stock material 22 may consist of three superimposed webs (also referred to as plies or layers) 24, 26, and 28 of biodegradable, recyclable and reusable thirty-pound kraft paper rolled onto a hollow cylindrical tube 29. A thirty-inch (76.2 cm) roll of this paper, which is approximately 450 feet long (137.2 m), will weigh about 35 pounds (15.9 kg) and will provide cushioning equal to approximately four 15 ft$^3$ (0.425 m$^3$) bags of plastic foam peanuts while at the same time requiring less than one-thirtieth the storage space.

As is explained in more detail below, the machine 20 includes conversion assemblies (hereinafter collectively referred to as the conversion assembly 30) which convert the sheet stock material 22 into a continuous unconnected strip having lateral pillow portions separated by a thin central band. This strip is connected along the central band to form a connected strip which is cut into sections 32 of a desired length.

The cut sections 32 each include lateral pillow portions separated by a thin central band and provide an excellent relatively low density cushioning product (pad).

The machine 20 includes a housing, indicated generally at 36, having an upstream or "feed" end 38 and a downstream or "discharge" end 40. The housing 36 is positioned in a substantially horizontal manner whereby an imaginary longitudinal line or axis 42 extending from the upstream end 38 to the downstream end 40 would be substantially horizontal. The terms "upstream" and "downstream" in this context are characteristic of the direction of flow of the stock material 22 through the machine 20. references to "up", "down", "horizontal", "vertical", and like terms with directional meanings or connotations are intended for purposes of description to refer to relative directions as shown in the illustrated embodiment. However, the invention is not intended to be limited to the illustrated orientation, as the machine may be used in other orientations such as in a vertical orientation.

The housing 36 includes side walls 37, a top or cover wall 39, a base plate or wall 43 and two end walls 44 and 46. The frame base wall 43 is generally rectangular and extends from the upstream end 38 to the downstream end 40 of the housing 36 in a generally horizontal plane. Although not perfectly apparent from the illustrations, the first or upstream wall 44 may be more specifically described as a thin rectangular wall having a rectangular stock inlet opening 47 passing therethrough. Alternatively, instead of the end wall 44, the side and base walls 37 and 43 may have upstream inwardly turned end sections that form a rectangular border around the stock inlet opening 47. The second or downstream end wall 46 is generally rectangular and planar and includes a relatively small rectangular outlet opening (not shown).

The first frame end wall 44 extends generally perpendicular in one direction from the upstream end of the frame base wall 43. In the illustrated embodiment of FIGS. 1 and 2, this direction is upward. The second end wall 46 is preferably aluminum and extends in generally the same perpendicular direction from the downstream end of the frame base wall 43. The housing 36 basically has a "C" shape, and one side of the frame base wall 43, which in this embodiment is the lower side, is a flat uninterrupted surface. The housing 36 also includes a box-like extension 49 removably attached to a downstream portion of the base wall 43. Although not shown in all of the drawings, the frame may be enclosed by a sheet metal housing, including side walls 37 and a top wall or cover 39.

The machine 20 further includes a stock supply assembly 50, a forming assembly 52, a feed assembly 54 powered by a feed motor 55, a cutting assembly 56 powered by a cutter motor 57, and a post cutting assembly 58. In the operation of the machine 20, the stock supply assembly 50 supplies the sheet stock material 22 to the forming assembly 52. The forming assembly 52 causes inward rolling of lateral regions of the sheet stock material 22 to form the lateral pillow portions of the continuous strip. The feed assembly 54 pulls the stock material 22 from the stock roll 21, through the stock supply assembly 50, and through the forming assembly 52 and also connects or stitches the central band of the unconnected strip to form the connected strip. As the connected strip travels downstream from the feed assembly 54, the cutting assembly 56 cuts the strip into sections 32 of a desired length that exit through the post-cutting assembly 58.

Turning now to the details of the various assemblies, the stock supply assembly 50 includes two laterally spaced apart brackets 62. The brackets 62 each have a shape generally similar to a sideways "U" and have two legs 64 and 65 extending perpendicularly outward from a flat connecting wall 66. (See FIGS. 1 and 2.) For each bracket 62, the connecting wall 66 is suitably secured to the downstream side of the frame end wall 44, such as with bolts. In the illustrated embodiment, the arm 64 is generally aligned with the frame base wall 43. However, the positioning of the brackets 62 is sometimes "dropped" so that the arm 64 is situated below (in the illustrated orientation) the base wall 43. For example, an intermediate portion of the connecting wall 66 may be situated at the same level as the base wall 43. Additionally or alternatively, a diagonal brace (not shown) may be used which extends between the connecting wall 66 and the leg 64 (see, for example, FIG. 11).

Both of the legs 64 have open slots 70 in their distal ends to cradle a supply rod 72. The supply rod 72 is designed to extend relatively loosely through the hollow tube 29 of the stock roll 21. As the stock material 22 is pulled through the machine 20 by the feed assembly 54, the tube 29 freely rotates thereby dispensing the stock material 22. A pin (not shown) may be provided through one or both ends of the supply rod 72 to limit or to prevent rotation of the supply rod 72 itself. The legs 64, the slots 70 and the supply rod 72 may be viewed as forming the stock-dispensing device of the stock supply assembly 50.

The other legs 65 of the U-shape brackets 62 extend from an intermediate portion of the frame end wall 44 and cooperate to mount a separating device 74. The separating device 74 includes a pair of mounting brackets 75 and three separating members 76, 77, and 78. One of the mounting brackets 75 is secured, as by welding or bolting, to the inner surface of one of the legs 65 at a distal portion (but not end) thereof. The other of the mounting brackets 75 is secured to the inner surface of the other of the legs 65 in the same manner so that the brackets are laterally aligned. The opposite ends of the separating members 76, 77 and 78 are non-rotatably attached to, and the members extend between, the mounting brackets 75. The number of separating members, namely three, may correspond to the number of layers or webs of the sheet stock material 22.

In the separating device 74, the separating members 76, 77 and 78 are horizontally spaced relatively thin cylindrical separating bars which extend in a transverse linear path, generally in a direction perpendicular to the upstream-downstream direction. The bars may include sleeves which are rotatably mounted around rods attached to the legs 65 of the brackets 62. Such sleeves are cylindrical and are sized to axially extend the entire transverse dimension (i.e. width) of the multi-ply stock material 22. Also, each of the sleeves has a circular cross-sectional shape that is of the same diameter along its axial dimension. The sleeves and/or bars of each separating member 76, 77, and 78 may all be of substantially the same diameter or, alternatively, the separating member 76 which engages the outer ply of the multi-ply stock material may be of a larger diameter. Details of a separating mechanism similar to the illustrated separating device 74 are set forth in U.S. Pat. No. 4,750,896. (This patent is assigned to assignee of the present application and its entire disclosure is hereby incorporated by reference in its entirety.)

The bracket legs 65 also cooperate to support a constant-entry device 80. The constant-entry device 80 includes a rod 82 fixedly mounted to the distal ends of the bracket legs 65 and a sleeve 84, extending the distance between the legs 65, rotatably positioned about the rod. Although not immediately apparent from the drawings, the sleeve 84 may include side flanges to keep stock material properly centered. Details of a "roller member" or a "bar member" similar to the illustrated constant-entry device 80 are set forth in U.S. Pat. No. 4,750,896.

After the stock material 22 is pulled from the stock roll 21 over the constant-entry device 80 and through the separating device 74, it is pulled through the stock inlet opening 47 to the forming assembly 52. The forming assembly 52 includes an internal forming device 90, an external forming device 92 (formed in the illustrated embodiment by a chute), a transverse guide structure 93 and a guide tray 94 (FIG. 3). The stock material 22 travels between a bottom surface of the internal forming device 90 and the frame base wall 43 until it reaches the guide tray 94. At this point, the transverse guide structure 93 and the guide tray 94 guide the stock material 22 longitudinally and transversely into the external forming device 92. The stock material 22 travels through the external forming device 92 and around the internal forming device 90 as it passes through the forming assembly 52 to form an unconnected strip of stock material. As the strip emerges from the external forming device 92, the guide tray 94 guides the strip into the feed assembly 54.

The illustrated internal forming device 90 is a three-dimensional forming frame shown isolated and in detail in FIGS. 4–6. The forming frame 90 has a body 95 and ribs 96 and 97 which are made of a bar-like material, such as metal rod. The body 95 has a "V" shape (when viewed from the top) and includes a pair of leg portions 98 connected together by a rounded nose portion 99. (See FIG. 4.) These components of the body 95 are positioned in a common plane which is tilted in the downstream direction in the cushioning conversion machine 20. (See FIGS. 1 and 2.) The leg portions 98 and the nose portion 99 are dimensioned so that the body 95 is approximately 14 inches (35.6 cm) wide (at its point of maximum width) and approximately 24 inches (61.0 cm) long.

The upstream rib 96 generally has a "U" shape when viewed from the downstream end and includes a pair of side leg portions 100 connected together by a bottom leg portion 101. (See FIG. 5.) The bottom leg portion 101 is generally linear and extends laterally approximately eight inches (20.3 cm). The side leg portions 100 are also generally linear and extend approximately 5 ¾ inches (14.6 cm). The bottom end of each of the side leg portions 100 is connected, via a rounded corner, to respective sides of the bottom leg portion 101. (See FIG. 5.) The upper ends of each of the side leg portions 100 is connected, via a rounded corner, to the upstream end of respective leg portions 98 of the body 95. (See FIG. 6.) In the illustrated embodiment, the body 95 and the rib 96 are formed from a continuous piece of rod-like material.

The downstream rib 97 also generally has a "U" shape when viewed from the downstream end and includes a pair of side leg portions 102 connected together by a bottom leg portion 103. (See FIG. 5.) The bottom leg portion 103 is generally linear and extends approximately 3 inches (7.6 cm). The side leg portions 102 are also generally linear and extend approximately 2¾ inches (7.0 cm). The bottom end of each of the side leg portions 102 is connected, via a rounded corner, to respective sides of the bottom leg portion 103. (See FIG. 5.) The upper ends of each of the side leg portions 102 are connected to transversely aligned connecting locations on the leg portions 98 of the body 95, these sections being located approximately 13⅛ inch (33.3 cm) from the upstream rib 96. (See FIG. 6.)

The internal forming device 90 may additionally include connecting components 104 for mounting the internal forming device to the machine's housing 36. In the illustrated embodiment, these connecting components are tubular receptacles attached to the center of the bottom leg portions 101 and 103 of the ribs 96 and 97. In the assembled machine 20, mounting rods would be coupled to these tubular receptacles so that the internal forming device 90 could be suspended in its correct orientation, such as from a strap (not shown) extending between the upstream and downstream ends of the housing 36.

Returning to FIGS. 1–3, the guide tray 94 is mounted directly on the frame base wall 43 while the transverse guide structure 93 and the external forming device or chute 92 are mounted on the guide tray 94. The guide tray 94 is trapezoidal in shape, as viewed in plan, having a broad upstream side 119 and a parallel narrow downstream side 120. The broad side 119 is positioned downstream of at least a portion of the internal forming device 90. The narrow side 120 is positioned adjacent the outlet opening in the frame end wall 46 and includes a rectangular slot 121 (FIG. 3) to accommodate the feed assembly 54. The guide tray 94 is not positioned parallel with the frame base wall 43, but rather slopes away (upwardly in the orientation shown in FIGS. 1 and 2) from the frame base wall 43 to the feed assembly 54.

The converging chute 92 is mounted on the guide tray 94 upstream of at least a portion of the internal forming device 90 and downstream slightly from the broad side 119 of the guide tray 94. The transverse guide structure 93 is mounted on the guide tray 94 just upstream of an inlet of the chute 92. The transverse guide structure 93 includes rollers 122 rotatably mounted on a thin "U" shape bracket 123. The distal ends of the U-shape bracket 123 are secured to the guide tray 94. Except for this mounting arrangement, the transverse guide structure 93 is similar to the "rollers and wire frame" disclosed in U.S. Pat. No. 4,750,896. It may be noted however, that if the inlet of the chute 92 is flared outward, the transverse guide structure 93 may not be necessary.

With the guide tray 94 and the transverse guide structure 93 mounted in this manner, the stock material 22 travels over the guide tray 94, under the lower portions of the internal forming device 90, between the rollers 122 of the transverse guide structure 93, and into the external forming device 92.

The stock material 22 emerges from the external forming device 92 as the continuous unconnected strip. The emerging strip is guided to the feed assembly 54 by the narrow downstream end 120 of the guide tray 94, which extends from an outlet opening of the external forming device 92 to the outlet opening in the frame end wall 46. The feed assembly 54 includes rotating feed members between which the stock material 22 travels, more specifically loosely meshed horizontally arranged drive gear 124 and idler gear 126. When the gears 124 and 126 are turned the appropriate direction, which in FIG. 2 would be clockwise for drive gear 124 and counterclockwise for idler gear 126, the central band of the strip is grabbed by the gear teeth and pulled downstream through the nip of the gears 124 and 126. This same "grabbing" motion caused by the meshing teeth on the opposed gears 124 and 126 simultaneously compresses or "coins" the layers of the central band together thereby connecting the same and forming the connected strip.

The drive gear 124 is positioned between the frame base wall 43 and the guide tray 94 and projects through the rectangular slot 121 in the guide tray 94. The drive gear 124 is fixedly mounted to a shaft 130 which is rotatably mounted to the upstream side of the frame end wall 46 by bearing structures 131. A sprocket 132 at one end of the shaft accommodates a chain 133 which connects the shaft 130 to a speed reducer 136. The speed reducer 136 acts as an interface between the feed assembly 54 and the feed motor 55 for controlling the rate the stock material 22 is "pulled" through the machine 20. As is best seen in FIG. 1, the feed motor 55 and the speed reducer 136 are mounted on the frame base wall 43 at approximately the same level as the forming assembly 52.

The idler gear 126 is positioned on the opposite side of the guide tray 94 and is rotatably mounted on a shaft 140. Shaft brackets 142 attached to an upstream side of the frame end wall 46 support the ends of the shaft 140 in spring-loaded slots 144. The slots 144 allow the shaft 140, and therefore the idler gear 126, to "float" relative to the drive gear 124 thereby creating an automatic adjustment system for the feed assembly 54.

Alternatively, the automatic adjustment system for the feed assembly 54 could be of the type disclosed in U.S. Pat. No. 5,709,642. In such an adjustment system, first and second tie members would be movably connected to the shaft 140 and would extend transversely with respect to the shaft 140. Each of the tie members would have one end in fixed transverse position relative to the machine's housing 36 and an adjustable stop which is selectively adjustable towards and away from the shaft 140. A spring member would be interposed between the shaft 140 and the adjustable stop to resiliently bias the shaft 140 towards the shaft 130. In this manner, the pinch force applied by the rotating feed members 124 and 126 could be adjusted without changing a minimum set distance between the shafts 130 and 140.

Additionally or alternatively, the rotating feed members 124 and 126 may be of the type contained in the stitching assembly disclosed in U.S. patent application Ser. No. 08/607,607. (This application is assigned to the assignee of the present application and its entire disclosure is hereby incorporated by reference in its entirety.) In such a stitching assembly, the first rotating feed member would have a plurality of radially outwardly extending projections around its circumference and the projections would have axially spaced apart segments defining a recess therebetween. The second rotating feed member would have axial punch segments which each include a peripheral edge portion for receipt into the first member's recesses. The peripheral edge portions would have opposite corners which are cooperative with the first member's projections to cut a row of slits in the overlapped portions of the stock material to interlock these overlapped portions.

In any event, the feed assembly 54 transforms the unconnected strip into the connected strip and this strip travels through the outlet opening in the frame end wall 46. The connected strip is then cut or otherwise severed by the severing assembly 56 into discrete sections 32 or cushioning products of the desired length. The severing assembly 56 may be of any suitable type, such as the types disclosed in U.S. Pat. No. 5,123,889, the type disclosed in U.S. patent application Ser. No. 08/110,349, and/or the type disclosed in U.S. Pat. No. 5,569,146. (This patent and these applications are assigned to the assignee of the present invention and their entire disclosures are hereby incorporated by reference in its entirety.) However, whatever type of severing assembly is used, the connected strip is divided into sections 32 of the desired length and these sections 32 then travel downstream to the post-severing assembly 58. A section 32 emerging from the post-severing assembly 58 may be directed to a desired packing location, the conversion of stock material 22 to discrete sections 32 of relatively low density cushioning dunnage product now being complete.

Thus, the cushioning conversion machine 20 may be viewed as including a conversion assembly 30 (i.e., the forming assembly 52, the feed assembly 54, etc.) which converts multi-ply stock material 22 into a three-dimensional cushioning product 32 and a stock supply assembly 50 which supplies the multi-ply stock material to the conversion assembly. The conversion assembly includes the forming assembly 52 which inwardly turns the lateral regions of the stock material 22 as it travels downstream therethrough.

Referring briefly back to FIGS. 1 and 2, the stock supply assembly 50 includes the separating device 74 which separates the individual plies 24, 26 and 28 of the stock material 22 upstream of the forming assembly 52. As is best seen in FIGS. 1 and 2, the inward turning of the stock material begins just downstream of the separating device 74. As was noted above, the separating members 76, 77 and 78 of the separating device 74 extend between the stock supply brackets 62 and extend in a linear path in a direction perpendicular to the upstream-downstream direction. As such, the plies 24, 26 and 28 of the stock material 22 traveling over the separating members 76, 77 and 78 are forced to follow a straight transverse path and are prevented from inwardly turning in the same direction as the forming assembly 52. Accordingly, in the stock supply assembly 50, the lateral regions of the stock material must abruptly begin their inwardly turning after engaging the separating members. This abruptness may effect the conversion process by, for example, resulting in excessive tension in the lateral regions which sometimes leads to ripping or tearing of the paper.

Turning now to FIG. 7, a preferred stock supply assembly 350 is shown. The stock supply assembly 350 may be incorporated into a cushioning conversion machine, such as the cushioning conversion machine 20 described above or any other cushioning conversion machine or method which falls within the scope of the claims. As is explained in more detail below, the stock supply assembly 350 allows a more gradual transition between the supply of the stock material to the machine's conversion assembly and the inward turning of lateral edges by the conversion assembly. Such an arrangement is believed to reduce edge-tension in the stock material and/or otherwise to enhance the conversion process.

The stock supply assembly 350, like the stock supply assembly 50 discussed above, includes two laterally spaced apart brackets 362 which are essentially the same as the brackets 62. Thus, the brackets 362 have two legs 364 and 365 extending perpendicularly outward from a flat connecting base wall 366. The legs 364 have open slots 370 in their distal ends which cradle a supply rod 372, such as the supply rod 72 discussed above, which is designed to extend relatively loosely through the hollow tube 29 of the stock roll 21 whereby as the stock material 22 is pulled through the machine by the feed assembly, the tube 29 will freely rotate thereby dispensing the stock material 22. The legs 364 may be replaced with other bracket portions if desired, such as the multi-position stock roll support bracket shown in U.S. Provisional Application No. 60/051,355, file Jun. 30, 1997 and entitled "Cushioning Conversion Machine/Method And Packaging System." (This application is assigned to the assignee of the present application and its entire disclosure is hereby incorporated by reference in its entirety.) In any event, the open slots 370 and the supply rod 372 may be viewed as forming the stock-dispensing device of the stock supply assembly 350.

The other legs 365 of the brackets 362 generally extend from the base wall 366 at a removed position parallel to the legs 364 and cooperate to mount a separating device, indicated generally at 374. The separating device 374 includes three transversely extending members 376, 377 and 378. The number of separating members, namely three, corresponds to the number of paper layers or webs or plies of the stock material 22. The separating device 374 separates the layers 24, 26 and 28 of the stock material 22 prior to their passing to the forming assembly.

The bracket legs 365 also cooperate to support a constant-entry device 380 which is rotatably mounted on the distal ends of the legs 365. The constant-entry device 380 may be of essentially the same construction and perform essentially the same function as the constant-entry device 80 discussed above. Particularly, the constahtentry device 380 provides a non-varying point of entry for the stock material 22 into the separating device 374 and forming assembly 52, regardless of the diameter of the stock roll 21. The member 380 may also be other than cylindrical in shape and may have a bowed or convex shape. That is, the constant entry member may progressively decrease in diameter from the middle thereof to its ends, preferably in a manner that provides a rounded or convexly curved outer surface similar to what is shown in FIG. 10. In accordance with the invention, such a rounded constant entry member, preferably a roller, may be incorporated into a cushioning conversion machine like that shown in FIGS. 1–3 in combination with or separately from the other novel features of the present invention.

Although not specifically shown in FIG. 7, the stock supply assembly 350 may additionally include a dancer roll, such as a gravity or spring-biased dancer roll, which defines the path of the stock material from the stock-dispensing device to the constant-entry device 380.

Referring now to FIGS. 7–10, the separating device 374 is mounted to the brackets 362 near but not at the distal ends of the legs 365. The outer separating member 376 of the separating device 374 includes end portions 400 and a central portion 402 extending therebetween. The end portions 400 are inwardly tapered relative to the central portion 402 towards the respective ends of the member 376. The inwardly tapered lateral end portions 400 of the member 376 are positioned to engage the ends of the lateral portions of the outer ply 24 of the stock material. In this manner, the outer ply 24 of stock material engaging the outer separating member 376 is not forced to follow a straight transverse path. Instead, the lateral portions of the outer ply 24 of stock material are inwardly urged in the same direction as the forming assembly inwardly turns the lateral edges of the stock material. This allows a gradual, rather than abrupt, transition between separating device 374 and the forming assembly 52 thereby reducing the chance of excessive edge-tension and/or otherwise enhancing the conversion process.

The end portions 400 preferably each occupy between 2%–6% of the entire axial length of the separating member 376, with the central portion 402 occupying the other 96%–88% of the axial length of the member 376. More preferably, the end portions 400 each occupy 3%–5%, and more preferably approximately 4% of the member's axial length. Thus, when the cushioning conversion machine is designed to convert stock material which is approximately 30 inches (76.2 cm) wide, the end portions 400 will preferably each occupy the outer 1.2 inches (3.0 cm) of the member 376, with the center portion 402 occupying the center 27.6 inches (70.1 cm) of the member 376.

The illustrated outer separating member 376 includes a rod 404, a sleeve 406, and a pair of end caps 408 connected to each end of the sleeve 406. The rod 404 is non-rotatably mounted between the bracket legs 376 and the sleeve 406 and caps 408 are rotatably mounted about the rod 404. The sleeve 406 forms the center portion 402 of the separating member 376 and is preferably cylindrical with a constant circular radial cross-sectional shape along its axial dimension.

The caps 408 each include a head 410 and a plug 412 connected to the head 410. The head 410 forms the inwardly tapering end portions 400 of the separating member 376. Preferably, the head 410 has a circular radial cross-section shape which decreases in size along its axial dimension and an axial cross-sectional shape resembling a top-truncated parabola. (FIG. 8.) The plugs 412 extend from the axially inner end of the respective head 410 and are sized for tight inserted receipt into the ends of the sleeve 406 whereby the sleeve 406 will not rotate relative to the end caps 408. The end caps 408 are preferably made of suitable material, such as plastic, so that they form a bearing surface relative to the rod 404.

The outer separating member 376 may additionally include a pair of springs 414 positioned around the rod 404 on opposite sides of the end caps 408, to provide biased transverse centering of the sleeve 406 and the caps 408 on the rod 404.

Another outer separating member 476 is shown in FIG. 10, which includes inwardly tapered end portions 490 and a central portion 492 extending therebetween. The separating member 476 includes a rod 494 which is non-rotatably mounted between the bracket legs 365 and a sleeve 496 which is mounted for rotation around the rod 494. The sleeve 496 forms the central portion 492 of the member and also the inwardly tapered lateral end portions 490 of the member. In the illustrated embodiment, the sleeve 496 is cylindrical and has a circular radial cross-sectional shape which changes size along its axial dimension. The radial cross-sectional size of the sleeve 496 preferably changes gradually along the central portion 492 of the separating member and more dramatically along the lateral end portions 490 of the separating member 476. Although not specifically shown in the drawings, the outer separating member 476 may additionally include a pair of springs positioned around the rod 494 on opposite sides of the sleeve 496, to provide biased transverse centering of the sleeve 496.

The intermediate separating member 377 is positioned to engage the intermediate ply 26 of the multi-ply stock material and is preferably of the same construction as the intermediate member 77 discussed above in connection with the separating device 76 of the machine 20. Thus, the intermediate member 376 includes a sleeve or rod having the same diameter along its entire axial length whereby it does not include inwardly tapered lateral end portions. This more economical non-tapered construction is preferred since the intermediate ply 26 experiences less excessive edge-tension problems than the outer ply 24 and/or the inner ply 28. The cross-sectional area (or diameter) of the intermediate member 377 is preferably less than the cross-sectional area of the central portion 402 of the outer member 376 or the central portion 492 of the outer member 476.

The inner separating member 378 is positioned to engage the inner ply 28 of the multi-ply stock material. The member 378 is preferably of the same general construction as the outer separating member 376 or the outer separating member 476. In this manner, the inner ply 28 of stock material engaging the inner separating member 378 is not forced to follow a straight transverse path. Instead, the lateral portions of the inner ply 28 are inwardly urged in the same direction as the forming assembly inwardly turns the lateral edges of the stock material. This allows a gradual, rather than abrupt, transition between separating device 374 and the forming assembly thereby reducing the chance of excessive edge-tension and/or otherwise enhancing the conversion process.

Preferably, the overall axial length of the inner separating member 378 is not the same as the overall axial length of the outer separating member 376. More preferably, the inner separating member 378 is slightly longer than the outer separating member, in the range of 1½% to 5% and more preferably in the range of 2.6%. This length arrangement is preferred since the inner separating member 378 engages the inner ply 28 which becomes the outer ply in the cushioning product 32 and thus must envelope or encapsulate the other plies 24 and 26.

Thus, in one embodiment, two of the separating members, namely the inner and outer separating members 376 and 378, include the inwardly tapering end portions.

However, a stock supply assembly wherein only the outer separating member includes the inwardly tapering end portions, wherein only the inner separating member includes the inwardly tapering end portions, or any other arrangement wherein at least one of the separating members includes the inwardly tapering end portions is possible with, and contemplated by, the present invention. Moreover, the incorporation of such a transversely extending member into a cushioning conversion machine which does not include a separating device is possible with, and contemplated by, the present invention.

When a cushioning conversion machine incorporating such a stock supply assembly 350 is used, the resulting method will include the steps of supplying a multi-ply stock material and converting the stock material into a three dimensional cushioning product. The converting step includes the step of inwardly turning lateral portions of the stock material as the stock material travels in a downstream direction. The supplying step includes the steps of dispensing the stock material from a continuous sheet of multi-ply stock material and engaging at least one ply of the dispensed stock material with a transversely extending member which inwardly urges the lateral end portions of the at least one ply in the same direction as the inwardly turning step of the converting step.

One may now appreciate that such stock supply assembly allows a more gradual transition between the supply of the stock material to the machine's conversion assembly and the inward turning of lateral edges by the conversion assembly.

Referring now to FIG. 11, another stock supply assembly 550 is shown. The stock supply assembly 550 may be incorporated into a cushioning conversion machine, such as the cushioning conversion machine 20 described above. As is explained in more detail below, the stock supply assembly 550 allows a more gradual transition between the supply of the stock material to the machine's conversion assembly and the inward turning of lateral regions of the stock material by the conversion assembly. Such an arrangement is believed to reduce tension in the lateral regions of the stock material and/or otherwise to enhance the conversion process.

The stock supply assembly 550, like the stock supply assembly 50, discussed above, includes two lateral spaced apart brackets 562 which are essentially the same as the brackets 62. Thus, the brackets 562 have two legs 564 and 565 extending perpendicularly outward from a flat connecting wall 566. For each bracket 562, the connecting wall 566 is suitably secured to the downstream side of the frame end wall 44, such as with bolts. In the illustrated embodiment, the positioning of the brackets 562 is "dropped" when compared to the brackets 62 of the stock supply assembly 50, so that the leg 564 is situated below (in the illustrated orientation) the base wall 43 and a center region of the connecting wall 566 is situated at the same level as the base wall 43. A diagonal brace 567 also is shown that extends between the connecting wall 566 and the leg 564.

The legs 564 have open slots 570 in their distal ends which cradle a supply rod 572, such as the supply rod 72 discussed above, which is designed to extend relatively loosely through the hollow tube 29 of the stock roll 21 whereby as the stock material 22 is pulled through the machine 20 by feed the assembly 54, the tube 29 will freely rotate thereby dispensing the sheet stock material 22. The supply rod 572 is non-rotatably secured in the slot 570 by a pin 571. The legs 564 may be replaced with other bracket portions if desired, such as the multi-position stock roll support bracket shown in U.S. Provisional Application No. 60/051,355, filed Jun. 30, 1997 and entitled "Cushioning Conversion Machine/Method and Packaging System." (This application is assigned to the assignee of the present application and its entire disclosure is hereby incorporated by reference in its entirety.) In any event, the open slots 570 and the supply rod 572 may be viewed as forming the stock-dispensing device of the stock supply assembly 550.

The other legs 565 of the brackets 562 are similar to the legs 65 of the brackets 62 discussed above. However, they additionally include a flat upturned (in the illustrated orientation) tail 573 at their distal ends. Preferably the tail 573 is formed in one piece with the other portions of the legs 565 and is flush with the vertical portion of the angle iron forming these other portions in the illustrated embodiment.

The legs 565 cooperate to mount a separating device 574. The separating device 574 includes a pair of mounting brackets 575 and three separating members 576, 577 and 578. One of the mounting brackets 575 is secured, as by welding or bolting, to one of the legs 565 at a distal portion (but not end) thereof. The other of the mounting brackets 575 is secured to the other of the legs 565 in the same manner so that the brackets 575 are laterally aligned. In a retrofit situation, the mounting brackets 575 may be mounted to the brackets 75 of the separator device 74 (once the separator rods 76–78 have been removed). In either case, the opposite ends of the separating members 576, 577 and 578 are non-rotatably attached to, and the separating members extend between, the mounting brackets 575. The number of separating members, namely three, corresponds to the number of layers or webs of the stock material 22.

The bracket legs 565 (and specifically the tails 573) also cooperate to support a constant-entry device 580 which is rotatably mounted on the distal ends of the legs 565. When using the separating device 574, the constant-entry device 80 discussed above may be used, but tearing may occur upstream of the separating device 574. For this reason, it is preferred to use the constant entry device 580 which is discussed in more detail below.

Turning now to FIGS. 12 and 13, the separating device 574 is shown in detail isolated from the other components of the stock supply assembly 550. The separating members 576, 577 and 578 are preferably cylindrical in cross-section and also preferably have the same cross-sectional diameter. A suitable diameter for the separating members 576, 577 and 578 would be, for example, ¼ inch (1 cm). The members may be made of any suitable metal or plastic which will not unduly interfere with the travel of the stock material through the separating device 574. Additionally or alternatively (but not specifically shown in the drawings), some or all of the separating members 576, 577 and 578 may be provided with a series of rings to provide a rotating sleeve arrangement.

In accordance with the present invention, the separating members 576, 577 and 578 do not follow a transverse linear path between the mounting brackets 575, but instead have a bowed or curved configuration. The direction of concavity/convexity of the members corresponds to the vertical component (in the illustrated orientation) of the travel of the lateral regions of the stock material as they are being inwardly turned by the forming assembly 52 (FIG. 1). In the illustrated embodiment, the lateral regions of the stock material are moved upwardly and inwardly by the forming assembly 52 during the conversion process. Thus, the separating members 576, 577 and 578 are concave when viewed from the upstream end of the cushioning conversion machine.

The magnitude of the concavity/convexity of each of the members corresponds to the amount of inward turning of the lateral regions of the stock material in the forming assembly 52 (FIG. 1) and the distance between the forming assembly 52 and the separating device 574. Specifically, the magnitude is such that there will be a gradual transition between the curvature of the stock material from the separating device 574 to the forming assembly 52 and is such that tension is evenly distributed though the full width of the stock material. For example, in a cushioning conversion machine wherein twenty-seven to thirty inch (68.6 cm to 76.2 cm) wide stock material is formed into a strip which is approximately eight to nine inches (20.3 cm to 22.9 cm) wide, the radius of curvature would preferably be between twenty-six and thirty-four inches (66.0 cm to 86.4 cm), more preferably between twenty-seven and thirty-three inches (68.6 cm to 83.8 cm, and even more preferably between twenty-eight and thirty-two inches (71.1 cm to 81.3 cm).

In the separating device 574 shown in FIGS. 11–13, the radius of the curvature varies between the separating members 576, 577 and 578. Specifically, the radius of curvature increases from the separating member 576 which engages the ply 24 forming the innermost ply of the cushioning product 32 (FIG. 1) to the separating member 578 which engages the ply 28 forming the outermost ply of the cushioning product 32. Also in the illustrated separating device 574, the separating members 576, 577 and 578 preferably are concentric (i.e., have the same center of curvature) whereby they form a "bull's-eye" arrangement. For example, the separating members 576, 577, and 578 could have concentric radii of curvature of 28$^{15}$/$_{16}$ inches (73.5 cm), 30 inches (76.2 cm), and 31$^{1}$/$_{16}$ inches (78.9 cm), respectively. In such an arrangement, the ends of the separating member 576 would be attached 1$^{1}$/$_{4}$ inches (3.2 cm) above the separating member 577 on the brackets 575, and the separating member 577 would be attached 1$^{1}$/$_{8}$ inches (2.9 cm) above the separating member 578.

Other types of separating members are possible. For example, the bowed separating members could have non-concentric radii of curvature thereby creating an eccentric, rather than bull's eye, arrangement. Additionally or alternatively, the bowed configuration of a separating member could be accomplished by sloped substantially linear end sections attached to a substantially linear central section. The curved and concentric separating members 576, 577 and 578 have been found to reduce tearing significantly better than these alternative designs when used with a conversion assembly such as the conversion assembly 30 (FIG. 1). However, these alternate designs may be acceptable and perhaps preferred with other types of conversion assemblies.

As was indicated above, the number of separating members, namely three, corresponds to the number of layers or webs of the stock material 22. If it is preferred to use a stock material with more or less plies, the number of separating members may be varied, or if it is desired for some reason to separate only some of the plies of the stock material, the number of separating members may be modified accordingly. Moreover, the incorporation of such a single member having this type of curved construction into a cushioning conversion machine which does not include a separating device is possible with, and contemplated by, the present invention. For example, with a multi-ply stock material, all of the plies could pass together over or under one such member. Alternatively, if single ply stock material is being converted, only one member would be necessary.

As was also indicated above, when using the separating device 574, it is preferred to use a constant-entry device 580 according to the present invention, as opposed to the constant entry device 80.

Referring briefly back to FIG. 1, the constant-entry device 80 provides a non-varying point of entry for the stock material 22 into the separating device 74 and forming assembly 52, regardless of the diameter of the stock roll 21. Thus, when a different diameter roll is used and/or as dispensation of the stock material 22 from the roll 21 decreases its diameter, the point of entry of the stock material 22 into the separating device 74 remains constant. This consistency is believed to facilitate the production of a uniform cushioning product.

As the stock material is drawn into the conversion assembly 30 from the stock roll 21, it will exert a downward force on the sleeve (or guide roller) 84 of the constantentry device 80 by reason of the pulling force needed to rotate the stock roll 21. The sleeve 84 is positioned at the optimum entry point for the stock material when it is subjected to normal downward forces associated with steady state operation of the machine throughout the normal diameter range of the stock roll 21. However, during start-up, where the stock roll must be accelerated from a rest condition to a rotational speed dictated by the feed rate of the feeding assembly 54, the pulling force and consequently the tension of the stock material may increase to a point that causes tearing of the paper.

The constant-entry device 580 shown in FIG. 11 also provides a constant point of entry for the stock material 22 when it is subjected to normal downward forces associated with steady state operation of the machine throughout the normal diameter range of the stock roll 21. However, the constant-entry device 580 additionally functions temporarily as a force dampening device during a high tension situation, such as during a start-up situation when it is necessary to overcome the starting inertia of the stock roll 21. Once the high tension is relieved, the constant-entry device 580 automatically returns to its normal operating position.

Referring more particularly to FIG. 14, the constant-entry device 580 of the stock supply assembly 550, like the constant entry device 80 of the stock supply assembly 50, includes end bearings 581 mounted near but not at distal ends of a rod 582 and a sleeve 584 supported at its distal ends by the end bearings 581. The sleeve 584 forms a guide roller extending the distance between the legs 565 and rotatably positioned about the rod. The constant-entry device 580 also includes a pair of lateral guides in the form of guide disks 583 disposed at laterally distant ends of the sleeve to guide the sheet stock material 22 over the constant-entry device 580. However, the rod 582 of the constant-entry device 580 is not fixedly mounted to bracket legs 565. Instead, in the constant-entry device 580, the rods 582 are resiliently supported and guided by spring-loaded mechanisms 585 which function as "shock absorbers" or "dampers" in the event of excessive tension.

As is shown in detail in FIG. 15, each of the spring-loaded mechanisms 585 are secured to one of the tails 573 of the bracket legs 565. Each spring-loaded mechanism 585 includes a tubular housing 586. The tubular housing 586 includes an elongated guide slot 587 having a width sufficient to receive the ends of the rod 582 and having a length corresponding to the desired range of vertical movement. The tubular housing 586 also includes openings 588 below the slot 587 for securing the housing to the legs 565 by a suitable fastening device, such as a threaded bolt.

A spring 589 is provided within the housing 586 that resiliently supports the end of the rod 582. In this manner, as the stock material passes over the sleeve 584, the rod 582 may resiliently float within the slot 587 within a certain range. Preferably, the springs 589 are pre-loaded so as to hold the guide roller at its normal operating position (its uppermost position in FIG. 15) when the guide roller is subjected to normal downward forces associated with steady state operation of the machine throughout the normal diameter range of the stock roll. However, during start-up, where the stock roll must be accelerated from a rest condition to a rotational speed dictated by the feed rate of the feeding assembly, the springs 589 yield and decrease the tension on the stock material. Once the high-tension situation has be resolved and the downward force on the stock material is normalized, the spring 589 will bias the rod 582 to its upper position within the slot 587.

The travel range that the spring mechanism 589 provides for the rod 582 should be great enough to accommodate anticipated high tension situations (such as overcoming starting inertia of the stock roll) yet limited enough to ensure adequate conversion of the stock material. It should perhaps be noted that constant-entry device 580 functions primarily temporarily in contrast to a dancer roll which continuously adjusts its position in response to differential changes in force or tension. In the illustrated embodiment, the travel range is preferably between 2½ inches (6.4 cm) and 4½ inches (11.4 cm). To accomplish this travel range, the spring 589 may be a coiled music wire having a spring rate of between 3 and 8 lbs/inch (53.6 Kg/m and 143.0 Kg/m) and more preferably about 5 lbs/inch (89.4 Kg/m).

In certain conversion machines, the constant-entry device 580 may be used without separator members having the concave configuration of the members 576, 577 and 578. However, it is not preferred to use this device 580 with the cushioning conversion machine 20 incorporating the separator members 76, 77 and 78, as it may increase tension and/or tearing problems. Nonetheless, it is contemplated that the constant entry device 580 of the present invention may be used with cushioning conversion machines with differently designed separator devices and/or without separator devices.

When the separator device 574 and the constant entry device 580 are used with the forming assembly 52, a smaller cushioning product is produced than that produced with the separator device 74 and the constant entry device 80. This smaller, more compact cushioning product is believed to be adequate, and possibly preferred, in certain packaging situations. However, to further increase the size of the pad, the internal forming device 90 of the forming assembly 52 may be replaced with another internal forming device 590 (FIGS. 16–18).

Referring briefly back to FIG. 1, the internal forming device 90 is positioned partially within the external forming device 92. The stock material 22 travels around the internal forming device 90 and through the external forming device 92 as it passes through the forming assembly 52. As the stock material 22 passes through the forming assembly 52, the lateral regions of the stock material 22 are inwardly turned over the leg portions 98 of the "V" shape body 95 of the internal forming device 90. As such, the leg portions 98 of the body 95 may be viewed as forming a turning perimeter for the lateral regions of the stock material 22. Since these leg portions 98 are positioned in a common plane, all of the portions of the turning perimeter of the internal forming device 90 are positioned in a common plane. Thus, in the internal forming device 90, there are no protrusions which project beyond the co-planar portions (the legs 98) of the turning perimeter.

Also as the stock material is passing through the forming assembly 52, portions of the internal forming device 90 define a holding surface which holds the central region of the stock material 22 during the inward turning of its lateral regions. Specifically, as indicated above, the bottom surfaces of the rib bottom leg portions 101 and 103 and the nose portion 99 define this holding surface. In the internal forming device 90, the rib bottom walls 98 and 100 and the nose portion 99 are situated in the same plane in a triangular configuration. (See FIG. 6.) Particularly, when a line is drawn from one of the ends of the bottom leg portion 101 of the upstream rib 96 to the vertex of the nose portion 99 of the body 95, it passes through the corresponding end of the bottom leg portion 103 of the downstream rib 96. When a line is drawn from the other end of the bottom leg portion 101 of the upstream rib 96 to the vertex of the nose portion 99 of the body, it passes through the other end of the bottom leg portion 103 of the downstream rib 97.

As was just noted above, the nose portion 99 of the body 95 of the internal forming device 90 is the downstream edge of the internal forming device 90. The nose portion 99 is essentially a "rounded corner" or "curved vertex" between the side leg portions 98 of the internal forming device 90. As such, the nose portion 99 does not include a transverse linear component.

The internal forming device 590 is shown isolated and in detail in FIGS. 16–18. In the illustrated embodiment, the internal forming device 590 is made by modifying or retrofitting the internal forming device 90 discussed above. However, as explained below, the internal forming device 590 may also be formed independently rather than as a retrofit.

The internal forming device 590 is a three-dimensional forming frame having a body 595 and ribs 596 and 597. The body 595 is substantially similar to the body member 95 of the internal forming device 90 and thus generally has a "V" shape (when viewed from the top) and includes a pair of leg portions 598 connected together by a nose portion 599. (See FIG. 16.) When incorporated into the cushioning conversion machine 20, these components of the body 595 would be positioned in a common plane which is tilted in the downstream direction. The leg portions 598 are the same as the leg portions 98 of the internal forming device 90 whereby the body 595 is approximately 24 inches long (61.0 cm). The width of the nose portion 599 is increased by two inches (5.1 cm) when compared to the nose portion 99 of the internal forming device 80. The increase in width of the nose portion 599 is accomplished to give it more of a flattened "U" shape as opposed to the rounded corner shape of the nose portion 99 of the internal forming device 90. Also, the increase in width of the nose portion 599 results in the body 595 being approximately sixteen inches (40.6 cm) wide, as compared to the body 95 which is approximately fourteen inches wide (35.6 cm).

The upstream rib 596, which also is increased in width by two inches (5.1 cm), generally has a "U" shape when viewed from the downstream end and includes a pair of side leg portions 600 connected together by a bottom leg portion 601. (See FIG. 17.) The side leg portions 600 are essentially the same as the side leg portions 100 of the internal forming device 90 and thus are generally linear and extend approximately 5¾ inches (14.6 cm). The bottom leg portion 601 is similar to the bottom leg portion 101 of the internal forming device 90 except that its width is increased by the noted two inches (5.1 cm) whereby it extends approximately ten inches (25.4 cm) as compared to the bottom leg portion 101 which extends eight inches (20.3 cm). As in the internal forming device 90, the upper ends of each of the side leg portions 600 are connected, via a rounded corner, to the upstream end of respective leg portions 598 of the body 595. (See FIG. 18.)

The downstream rib 597 also generally has a "U" shape when viewed from the downstream end and includes a pair of side leg portions 602 connected together by a bottom leg portion 603. (See FIG. 17.) The side leg portions 602 are essentially the same as the side leg portions 102 of the internal forming device 90 and thus are generally linear and extend approximately 2¾ inches (7.0 cm). The bottom leg portion 603 is essentially the same as the bottom leg portion 103 of the internal forming device 90 except that its width is increased by two inches (5.1 cm) whereby it extends approximately five inches (12.7 cm) as compared to the bottom leg portion 101 which extends three inches (7.6 cm). The bottom end of each of the side leg portions 602 is connected, via a rounded corner, to respective sides of the bottom leg portion 603. (See FIG. 17.) The upper ends of each of the side leg portions 602 are connected to aligned sections of the leg portions 598 of the body 595, these sections being approximately 13⅛ inch (33.3 cm) from its upstream end. (See FIG. 18.)

In the illustrated retrofitted embodiment, the increase in width of the nose portion 599 is accomplished by a two inch (5.1 cm) extension piece centrally inserted therein. For example, the nose portion 599 is centrally cut and then the extension piece is sandwiched between the cut ends and secured in place by welding. Likewise, the increase in width of the bottom leg portions 601 and 603 of the ribs 596 and 597 is accomplished by two inch (5.1 cm) extension pieces centrally inserted therein. However, if the internal forming device 590 is not being made as retrofit, the portions 595, 596 and 597 could be formed in the same manner as the portions 95, 96 and 97 of the internal forming device 90 to obtain the increase in width.

The internal forming device 590 may additionally include coupling components 604 of essentially the same construction, and for the same purpose as, the coupling components 104 of the internal forming device 90.

The internal forming device 590 additionally includes a pair of wing portions 610. In the illustrated embodiment, the wing portions 610 are made of the same bar-like material as the rest of the internal forming device 590. Each wing portion 610 generally has an "L" shape with a long leg portion 612 and a shorter leg portion 614 extending from one end thereof. The union between the leg portions 612 and 614 is a rounded corner forming a slightly less than perpendicular (i.e., 75° to 80°) angle. The leg portion 612 extends approximately 9 inches (22.9 cm) and the leg portion 614 extends approximately 1½ inches (3.8 cm).

The wing portions 610 are attached to the top of the side leg portions 598 of the body 595 and extend upwardly therefrom. More specifically, the distal end of the leg portion 612 of one of the wing portions 610 is secured to one of the side leg portions 598 just downstream of the connection point for the downstream rib 597. To this end, the leg portion 612 preferably has a contoured edge so that it can lay substantially flush against the top surface of the leg portion 598. (See FIGS. 16 and 18.) The distal end of the leg portion 614 of this wing portion is secured to this same leg portion 598 just upstream of the corner forming the transition to the nose portion 599. Thus, in the modified forming assembly, the wing portions 610 will be positioned within the external forming device 92.

The internal forming device 590 further includes a downstream rib 620 which includes a pair of side leg portions 622 and a bottom leg portion 623 extending therebetween. (See FIG. 18.) The bottom leg portion 623 is generally linear and extends approximately 6 inches (15.2 cm), as compared to the bottom leg portion 603 of the rib 597 which extends approximately five inches (12.7 cm). The side leg portions 622 extend approximately 3³⁄₁₆ inches (8.1 cm), as compared to the side leg portions 602 of the rib 597 which extend 2¾ inches (7.0 cm).

The bottom end of each of the side leg portions 622 is connected, via a rounded corner, to respective sides of the bottom leg portion 623. (See FIG. 17.) It may be noted that while the side leg portions 602 of the rib 597 slant inwardly to meet the bottom leg portion 603, the side leg portions 622 of the rib 620 extend generally perpendicularly from the plane of the body 595. The upper ends of each of the side leg portions 622 is connected to aligned sections of the leg portions 598 of the body 595, these sections being approximately 13⅛ inch (33.3 cm) from its upstream end and thus at the same point as the side leg portions 602 of the rib 597 are connected to the body. (See FIG. 18.)

As the stock material 22 passes through the forming assembly 52, the lateral regions of the stock material 22 are inwardly turned over the upper portions of the internal forming device 590, particularly the leg portions 598 of the "V" shape body 595 and the wing portions 610. As such, the leg portions 598 and the wing portions 610 may be viewed as forming a turning perimeter for the lateral regions of the stock material 22. Although the leg portions 598 of the body 595 are positioned in a common plane, the wing portions 610 project beyond this plane. In this manner, the wing portions 610 form protrusions which project beyond (and more particularly extend perpendicularly from) the co-planar portions of the turning perimeter. These protrusions formed by the wing portions 610 result in an increase in the loft (increase in thickness and thus a decrease in density for a given amount of stock material) of the cushioning product produced by the cushioning conversion machine 20. Also, the geometry of the wing portions 610 results in the protrusion increasing in the downstream direction, in contrast to the overall geometry of the internal forming device 590 which decreases in the downstream direction.

In the internal forming device 590, the bottom leg portion 601 of the rib 596, the bottom leg portion 623 of the rib 620, and the nose portion 599 of the body 595 hold the central regions of the stock material 22 as its lateral regions are inwardly turned. In this manner, the portions 601, 623 and 599 form a "holding surface" which holds the central regions of the stock material while its lateral regions are inwardly turned.

In the internal forming device 590, the bottom leg portion 601 of the rib 596, the bottom leg portion 603 of the rib 597 and the nose portion 599 are situated in the same plane in a triangular configuration. (See FIG. 18.) Particularly, when a line is drawn from one of the ends of the bottom leg portion 601 of the upstream rib 596 to the vertex of the nose portion 599 of the body 595, it passes through the corresponding end of the bottom leg portion 603 of the downstream rib 597. When a line is drawn from the other end of the bottom leg portion 601 of the upstream rib 596 to the vertex of the nose portion 599 of the body, it passes through the other end of the bottom leg portion 603 of the downstream rib 597. However, the bottom leg portion 603 of the rib 597 extends below this line whereby the bottom leg portion 623 of the rib 620 forms a projection which projects beyond a plane extending from the downstream edge of the surface (the leg portion 601) to the upstream edge of the surface (the nose portion 599). Instead, the bottom leg portion 623 extends below this plane thereby forcing the central regions of the stock material 22 to travel an increased distance around the rib 620. This increased travel path at an intermediate region of the internal forming device 590 for the central regions of the stock material results in less stock material at the central portion of the cushioning product.

Thus, the rib 620 extends laterally beyond and also extends below the rib 597 thereby "overshadowing" or "superseding" the rib 597 whereby it does not contact the stock material 22 during the forming process. For this reason, if the internal forming device 590 was not being made as a retrofit to the internal forming device 90, the rib 597 could be eliminated from internal forming device 590. In such a case, the coupling component 604 could instead be attached to a central region of the rib 620.

The nose portion 599 of the body 595 forms the downstream edge of the internal forming device 590. As was explained above, the nose portion 599 of the body 595 of the internal forming device 590 is transversely extended 2 inches (5.1 cm) when compared to the nose portion 99 of the body 95 of the internal forming device 90. The nose portion 99 of the internal forming device 90 is essentially a "rounded corner" or "curved vertex" between the side leg portions 98 of the body 95 and does not include a transverse linear component. In contrast, the nose portion 599 of the body portion 595 of the internal forming device 590 includes a transverse linear component which extends in a direction perpendicular to the upstream-downstream direction.

As was indicated above, the internal forming device 590 may be used with the separator device 574 and the constant entry device 580. However, the internal forming device 590 may be advantageously incorporated into a cushioning conversion machine without these devices. Also, certain portions of the internal forming device 590 may be advantageous when it is desired to change certain features of a cushioning product. For example, if it were desired to increase the loft of a cushioning product, the wing portions 610 could be added to a internal forming device. Additionally or alternatively, if it were desired to decrease the amount of stock material which forms the central portion of the cushioning product, the rib 620 could be added to an internal forming device. A further addition or alternative is to modify the downstream end of an internal forming device to include a transverse linear component.

Referring now back to the internal forming device 90, the internal forming device 90 coacts with the external forming device 92 during the inward turning of the lateral regions of the stock material 22. As part of this coaction, certain portions of the internal forming device 90 define a holding surface which holds the central region of the stock material 22 during the inward turning of the lateral regions of the stock material 22. More specifically, the internal forming device 90 holds the central region of the stock material 22 at a predetermined distance from the external forming device's bottom wall, this distance being different than the distance that the stock material would pass in the absence of the internal forming device 90. With particular reference to the internal forming device 90, the bottom surfaces of the rib bottom leg portions 101 and 103 define the holding surface.

Turning now to FIG. 19, another forming assembly 680 is shown in a conversion machine along with the stock supply assembly 550. The machine is similar to the machine 20 (FIGS. 1–3) except for the stock supply assembly 550 and the forming assembly 680.

With reference to FIG. 20, the forming assembly 680 includes an internal forming device 690, as well as an external forming device 692 which is similar to the external forming device 92 of the forming assembly 52 in FIG. 1. The external forming device 692 is mounted on an guide tray 694, which is similar to the guide tray 94 shown in FIG. 3.

Referring now to FIGS. 20 and 21, the guide tray 694 is mounted at an angle relative to a base wall 643 of a housing 636 of the machine 520 in substantially the same manner described above in connection with the mounting of the guide tray 94 in the machine 20 (FIG. 3). The internal forming device 690 includes connecting components 702 which adjustably support the internal forming device 690 in the desired orientation relative to the external forming device 692 and the housing 636 of the machine 620, similar to connecting components 104 (FIG. 1). Preferably the internal forming device 690 extends at least partially within the external forming device 692.

As shown in FIGS. 21–26, the internal forming device 690 according to the present invention includes a central guide portion 704 which extends substantially the entire length of the internal forming device 690. The central guide portion 704 is generally parallel to the central longitudinal axis of the external forming device or converging chute 692. The central guide portion 704 has a bottom holding or guide surface which functions to hold the central region of the stock material while its lateral regions are inwardly turned as the stock material is drawn through the forming assembly 680. Unlike the holding surface provided by the internal forming device 90 (FIG. 6) and the internal forming device 590 (FIG. 19), the central guide portion 704 provides a substantially continuous surface over the length of the internal forming device 690, thereby permitting the central guide portion 704 to act on the stock material at any point as it travels through the forming assembly 552.

Disposed above the central guide portion 704 is an upper member, indicated generally at 706, that forms a cascade of stages 708, 710, and 712. The upper member 706 may be formed integrally with the central guide portion 704 or connected to the central guide portion 704 as shown by fasteners 713 at the upstream end and by spacers 714 at the downstream end of the internal forming device 690.

As in the forming devices 90 and 590 described above, the overall geometry of the internal forming device 690 decreases in the downstream direction. However, unlike the previously described forming devices 90 and 590, the geometry of the internal forming device 690 does not decrease linearly. (See FIGS. 21 and 22.) In forming devices 90 and 590, side leg portions 98 and 598 form linear decreasing laterally outward edge surfaces which continuously guide lateral regions of the stock material 22 (see FIGS. 4 and 16). In contrast, the stages 708, 710 and 712 of the internal forming device 690 form discontinuous laterally outward edge surfaces with relatively relieved portions therebetween. This has been found to facilitate the formation of creases in the stock material, as will be further explained below.

Each stage 708, 710 and 712 has in plan view a generally trapezoidal shape with rounded corners (see FIG. 22), and each stage generally has a smaller lateral dimension in the downstream direction. Upstream stage 708 has a generally trapezoidal top 716 and a laterally outer edge wall or skirt 718 which extends generally perpendicular to the top 716 and which wraps around the upstream end of the upstream stage 708. The skirt 718 preferably tapers off with decreasing height in the downstream direction as shown in FIG. 21.

Intermediate stage 710 also has a generally trapezoidal top 719 and a skirt 720 which extends substantially perpendicular to the top 719 and which wraps around the upstream end of the stage 710 with decreasing height in the downstream direction. The intermediate stage 710 is connected to the upstream stage 708 by a connecting wall 721 which is aligned so that the downstream end of the upstream stage 708 overlaps the upstream end of the intermediate stage 710 in an offset relationship when viewed in a direction perpendicular to the bottom guide surface formed by the central guide portion 704.

The downstream stage 712 has a generally trapezoidal top 722 with a central notch 724 extending upstream from the downstream end. At the upstream end of the downstream stage 712, the downstream stage 712 is connected to the intermediate stage by a connecting wall 723 which is aligned so that the downstream end of the intermediate stage 710 overlaps the upstream end of the downstream stage 712 in an offset relationship when viewed in a direction perpendicular to the bottom guide surface formed by the central guide portion 704. The downstream stage 712 in the illustrated embodiment lacks a skirt, however, the use of a downstream stage with a skirt is within and is contemplated by the present invention.

The top 716 and the skirt 718 of the upstream stage 708, the top 719 and the skirt 720 of the intermediate stage 710, and the top 722 of the downstream stage 712 form respective laterally outer side control surfaces 740, 741 and 742 which guide the lateral regions of the stock material 22 as they inwardly fold around the internal forming device 690, distributing the stock material 22 outwardly beyond a path the stock material 22 would otherwise follow. The tops 716, 719 and 722 of the respective stages 708, 710 and 712 are not only displaced out of a common plane (i.e., stepped with respect to one another) but are angled relative to each other in a downstream direction, as is particularly evident in FIGS. 21 and 23. In the illustrated embodiment, for example, the top 716 of the upstream stage 708 is substantially parallel to the base wall 643 of the housing 636 (horizontal in the illustrated orientation). A portion of the central guide portion 704 also is parallel to the base wall 643 in an area disposed between the upstream stage 708 and the base wall 643, but then the central guide portion 704 extends approximately parallel to a bottom wall of the external forming device 692 and the guide tray 694 in the vicinity of the intermediate stage 710. The top 719 of the intermediate stage 710 lies in a plane which inclines relative to the horizontal base wall 643, and is substantially parallel to the central guide portion 704 and the guide tray 694 disposed therebelow. The top 722 of the upstream stage 712 also inclines relative to the horizontal base wall 643, although at a steeper angle in the illustrated embodiment than the top 719 of the intermediate stage 710. The downstream end of the central guide portion 704 is angled relative to the base wall 643 and the guide tray 694 to extend substantially parallel to the top 722 of the downstream stage 712. The internal forming device 690 preferably extends at least partially within the external forming device 692, and preferably as shown in FIGS. 20 and 21. In addition, the downstream stage 712 preferably fills a substantial portion of the cross-sectional area of the downstream end of the external forming device 692.

As mentioned previously, the internal forming device 690 is adjustably mounted in the cushioning conversion machine 520 and other orientations of the internal forming device 690 are within and are contemplated by the present invention. In addition, other relative angles between the stages are within and are contemplated by the present invention. Variations in orientation and relative angles between the cascading stages may be desirable for different stock material and/or for different properties in the resulting cushioning products.

The cascading stages 708, 710 and 712 have spaces or regions therebetween which are relieved relative to the laterally outer side control surfaces 740, 741, and 742 of the respective stages 708, 710 and 712. For example, there is a relieved region 730 formed between the upstream stage 708 and the intermediate stage 710. Another relieved region 732 is formed between the intermediate stage 710 and the downstream stage 712. The relatively relieved regions 730 and 732 extend the height of the cascade portion, thereby providing a complete separation of the side control surfaces 740, 741, and 742 of the stages 708, 710 and 712, respectively. As shown in the illustrated embodiment, the relieved regions 730 and 732 extend from a lower upstream area in a diagonal relative to the bottom surface of the central guide portion 704 to a higher downstream area.

These relatively relieved regions 730 and 732 facilitate the formation of creases in the lateral regions of the stock material, thereby increasing the loft of the pillow portions of the cushioning product. Each stage 708, 710 and 712 guides the lateral regions of the sheet stock material along paths which are laterally outward of the paths the lateral regions would follow in the absence of the internal forming device. In particular, the downstream stage 712 performs a function comparable to the wing portions 610 of the internal forming device 590 shown in FIG. 19, i.e. as a protrusion relative to the bottom guide surface that has a height dimension which is considerably greater than that of the internal forming device 90 shown in FIGS. 1–3. The lateral regions of the sheet stock material move over the stages 708, 710 and 712 and interposed relatively relieved regions 730 and 732 with an undulating motion. The relatively relieved regions 730 and 732, allow the lateral regions of the stock material to move inwardly, thereby facilitating the formation of creases in the lateral regions of the stock material that tend to increase the loft and cushioning properties of the resulting cushioning product. The central guide portion 704 and the stages 708, 710 and 712 cooperate in guiding the stock material so that a substantial portion of the stock material is contained in the pillow portions of the resulting cushioning product.

The progression of the stock material around the internal forming device 690 is illustrated in FIGS. 27–29. As the sheet stock material 22 passes the upstream stage 708 (see FIG. 27), the central guide portion 704 holds the central region of the stock material 22 within a desired distance from the external forming device's bottom wall, while the outer side control surfaces 740 (see FIG. 21), formed by the top 716 and the skirt 718 of the upstream stage 708, guide the lateral regions of the stock material 22 outwardly. As mentioned above, the relieved region 730 (see FIGS. 21 and 23) between the downstream stage 708 and the intermediate stage 710 facilitates the formation of creases in the lateral regions of the stock material 22, such that as the stock material 22 passes the intermediate stage 710 (FIG. 28) the lateral regions of the stock material 22 may include enhanced creases or folds which add to the loft and cushioning ability of the resulting cushioning product. In the intermediate stage 710, the central guide portion 704 continues to hold the central region of the stock material 22 at a predetermined maximum distance from the external forming device's bottom wall, and the outward lateral side control surfaces 741 (see FIGS. 21 and 23), formed by the top 719 and the skirt 720 of the intermediate stage 710, guide the lateral regions of the stock material 22 outwardly, although not to as great an extent as the generally wider upstream stage 708. As the stock material 22 passes through the downstream relieved region 732, creases may form in the lateral regions of the stock material 22 to further enhance the cushioning properties of the resulting cushioning product. As the stock material 22 passes the downstream stage 712, the final form of the strip of cushioning becomes more evident as lateral edges of the stock material 22 come together and begin to overlap. The central guide portion 704 continues to hold the central region of the stock material 22 at a predetermined maximum distance from the external forming device's bottom wall, although the increased incline of the central guide portion 704 at the downstream end increases this distance. The side control surfaces 742 continue to guide the stock material 22 as the lateral ends of the stock material 22 overlap. The lateral ends of the stock material 22 pass through the notch 724 (see FIGS. 22 and 23) in the downstream end of the downstream stage 712. The notch 724 facilitates the overlapping of the lateral ends of the stock material 22, and the width of the notch 724 affects the width of the overlap as the strip of cushioning enters the feed assembly 54 (FIG. 3) to be connected to form the connected strip of cushioning. Preferably, the lateral ends of the stock material overlap only so much as is necessary to connect the stock material along a central band so that it does not come apart in use, leaving as much stock material as possible in the lateral regions to crumple, crease and provide cushioning pillow portions in the completed cushioning product.

Although the illustrated internal forming device 690 has a plurality of separate parts, alternatively the internal forming device 690 may be formed of a suitable material as a unitary device. For example, the internal forming device 690 may be made of a plastic material, including a polycarbonate such as Lexan®. Furthermore, although in the illustrated embodiment the stages 708, 710 and 712 are formed as integral portions of the upper member 706, alternatively one or more stages 708, 710 and/or 712 may be formed as discrete components which are separately connected to the central guide portion 704. Also, the relieved regions 730 and 732 between the stages 708, 710, and 712 may be integrally bounded by interior side walls which contribute to the overall strength and rigidity of the internal forming device 690. For example, a wall may extend between the lower end of the side control surface 740, the lower front edge of the upstream stage 708, the connecting wall 721, and the central guide portion 704 to form a continuous surface therebetween. Similar walls may be formed in the sides of the intermediate stage 710 and the downstream stage 712 such that the internal forming device 690 is a single integral unit.

As was indicated above, the internal forming device 690 preferably is used with the separator device 574 and the constant entry device 580. However, the internal forming device 690 may be advantageously incorporated into a cushioning conversion machine without these devices, or with any other cushioning conversion machine or method.

Although the invention has been shown and described with respect to a certain preferred embodiment or embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A cushioning conversion machine comprising:
   a conversion assembly which converts a sheet stock material into a relatively as dense cushioning product; the conversion assembly including a forming assembly which inwardly turns lateral regions of the sheet stock material as the sheet stock material travels through the forming assembly in an upstream to downstream direction;
   the forming assembly including an external forming device and an internal forming device positioned at least partially within the external forming device, the sheet stock material passing between the external forming device and the internal forming device as it travels through the forming assembly;
   the internal forming device having a central guide portion having a bottom guide surface extending substantially continuously at least in a region coextensive with the external forming device for guiding a central region of the sheet stock material as its lateral regions are inwardly turned, and a cascade portion including multiple stages disposed above the bottom guide surface of the guide portion and defining therebetween relatively relieved areas in lateral regions of the internal forming device that facilitate the formation of creases in the lateral regions of the sheet stock material, wherein each stage has a top guide surface and lateral guide surfaces depending from the top guide surface, the lateral guide surfaces forming lateral edges inclined relative to the top guide surface.

2. The cushioning conversion machine of claim 1, wherein the relatively relieved areas are formed in lateral sides of the internal forming device.

3. The cushioning conversion machine of claim 2, wherein the relatively relieved areas extend the height of the cascade portion.

4. The cushioning conversion machine of claim 1, wherein each stage has a substantially trapezoidal shape.

5. The cushioning conversion machine of claim 4, wherein each stage has rounded corners.

6. The cushioning conversion machine of claim 1, wherein each stage has laterally outer edge surfaces which converge toward each other in a downstream direction such that each stage has a lateral dimension which is smaller than the maximum lateral dimension of an adjacent downstream stage.

7. The cushioning conversion machine of claim 1, wherein the stages are arranged in an overlapping relationship when viewed in a direction substantially perpendicular to the bottom guide surface.

8. The cushioning conversion machine of claim 1, wherein at least one stage has a laterally outer edge surface which is inclined relative to the bottom guide surface and which has lateral side walls extending upward from the outer edge surface.

9. The cushioning conversion machine of claim 8, wherein the upstream stage has a wall extending across the upstream end of the internal forming device.

10. The cushioning conversion machine of claim 8, wherein the lateral side walls have decreasing heights in the downstream direction.

11. The cushioning conversion machine of claim 1, wherein at least one of the stages has a central portion which is relieved relative to an upper surface of that stage.

12. The cushioning conversion machine of claim 11, wherein the downstream stage has a central notch extending from a downstream edge.

13. The cushioning conversion machine of claim 1, wherein at least one of the stages has a top surface which is inclined relative to the bottom guide surface.

14. The cushioning conversion machine of claim 13, wherein at least two stages have top surfaces which are inclined relative to the bottom guide surface.

15. The cushioning conversion machine of claim 14, wherein the at least two stages have top surfaces which are inclined relative to each other.

16. The cushioning conversion machine of claim 1, wherein the upstream stage is mounted on spacers to elevate the upstream stage above the bottom guide surface.

17. The cushioning conversion machine of claim 1, wherein each stage is connected to at least an adjacent stage.

18. The cushioning conversion machine of claim 1, wherein the cascade portion includes at least three stages.

19. The cushioning conversion machine of claim 1, wherein the stages are stepped relative to one another.

20. The cushioning conversion machine of claim 1, wherein the bottom guide surface has at least two sections, each section being inclined relative to an adjacent section.

21. The cushioning conversion machine of claim 1, wherein the internal forming assembly is formed of a plastic material.

22. A method of making a dunnage product, comprising:
converting a sheet stock material into a relatively less dense cushioning product, including inwardly turning lateral regions of the sheet stock material as the sheet stock material travels through a forming assembly in an upstream to downstream direction;
passing the sheet stock material between an external forming device and an internal forming device which are included in the forming assembly;
guiding a central region of the sheet stock material with a substantially continuous bottom surface of a central guide portion of the internal forming device to minimize the formation of creases in the central region of the stock material as the lateral regions of the stock material are inwardly turned; and
guiding the lateral regions of the sheet stock material in a laterally undulating notion to facilitate the formation of creases in the lateral regions of the sheet stock material with a cascade portion of the internal forming device that is disposed above the bottom surface of the central guide portion, the cascade portion including a plurality of stages defining lateral relatively relieved areas therebetween.

23. An internal forming device for a cushioning conversion machine, intended to be positioned at least partially within an external forming device of the machine, comprising a central guide portion having a bottom guide surface extending substantially continuously from an upstream end to a downstream end of the internal forming device for guiding a central region of the sheet stock material as its lateral regions are inwardly turned, and a cascade portion of the internal forming device including multiple stages disposed above the bottom guide surface of the central guide portion and defining therebetween relatively relieved areas in lateral regions of the internal forming device that facilitate the formation of creases in the lateral regions of the sheet stock material, wherein each stage has a top guide surface and lateral guide surfaces depending from the top guide surface, the lateral guide surfaces forming lateral edges inclined relative to the top guide surface.

24. A cushioning conversion machine for converting sheet stock material into a relatively lower density cushioning product as the sheet stock material moves through the machine from an upstream end toward a downstream end, comprising a forming assembly including an internal forming device and an external forming device, the internal forming device having at least one top portion with a pair of generally longitudinally converging and coplanar lateral top edges, and at least one lateral side edge depending from each top edge and longitudinally inclined relative to the plane of the top edge the internal forming device further including a base plate forming a substantially continuous surface extending at least within the external forming device to cooperatively guide central regions of the stock material therebetween; the external forming device having converging sidewalls cooperating with the internal forming device to inwardly turn lateral regions of the stock material.

25. A cushioning conversion machine as set forth in claim 24, wherein the inclined side edges are inclined such that an upper end is farther downstream than a lower end.

26. A cushioning conversion machine as set forth in claim 24, wherein a control surface extends between the top edges and the side edges.

* * * * *

UNITED STATES PATENT AND TRADEMARK OFFICE
CERTIFICATE OF CORRECTION

PATENT NO. : 6,210,310 B1  Page 1 of 1
DATED : April 3, 2001
INVENTOR(S) : Thomas E. Manley It is certified that error appears in the above-identified patent and that said Letters Patent is hereby corrected as shown below:

<u>Column 25, claim 1,</u>
Line 60, please replace "as" with -- less --.

<u>Column 27, claim 22,</u>
Line 30, please replace "notion" with -- motion --.

Signed and Sealed this

Twenty-fifth Day of December, 2001

Attest:

JAMES E. ROGAN
*Attesting Officer*   *Director of the United States Patent and Trademark Office*